US012756751B2

(12) United States Patent
Ramamoorthy et al.

(10) Patent No.: US 12,756,751 B2
(45) Date of Patent: *Oct. 6, 2026

(54) METHOD AND DEVICE FOR STORING AND DISTRIBUTING FILE CONTENT IN MC NETWORK

(71) Applicant: SAMSUNG ELECTRONICS CO., LTD., Suwon-si (KR)

(72) Inventors: Arunprasath Ramamoorthy, Bangalore (IN); Kiran Gurudev Kapale, Bangalore (IN); Basavaraj Jayawant Pattan, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 50 days.

This patent is subject to a terminal disclaimer.

(21) Appl. No.: 18/794,558

(22) Filed: Aug. 5, 2024

(65) Prior Publication Data

US 2024/0396959 A1 Nov. 28, 2024

Related U.S. Application Data

(63) Continuation of application No. 18/449,607, filed on Aug. 14, 2023, now Pat. No. 12,088,659, which is a (Continued)

(30) Foreign Application Priority Data

Oct. 1, 2020 (IN) ............................. 202041042798
Nov. 3, 2020 (IN) ............................. 202041047979
Sep. 14, 2021 (IN) ............................. 202041042798

(51) Int. Cl.
*H04L 67/06* (2022.01)
*H04L 9/40* (2022.01)
(Continued)

(52) U.S. Cl.
CPC .......... *H04L 67/06* (2013.01); *H04L 63/0876* (2013.01); *H04L 67/1097* (2013.01); *H04L 67/566* (2022.05)

(58) Field of Classification Search
CPC ... H04L 67/06; H04L 67/566; H04L 63/0876; H04L 67/1097
(Continued)

(56) References Cited

U.S. PATENT DOCUMENTS 6,584,612 B1 * 6/2003 Mueller .................. G06F 9/445 717/118
10,992,618 B2 4/2021 Pattan et al.
(Continued)

FOREIGN PATENT DOCUMENTS

CN 110383940 A 10/2019
CN 110463233 A 11/2019
(Continued)

OTHER PUBLICATIONS

3rd Generation Partnership Project; Technical Specification Group Services and System Aspects; Functional architecture and information flows to support Mission Critical Data (MCData); 3GPP TS 23.282 v17.8.0, Sep. 2021, 235 pages.
(Continued)

*Primary Examiner* — Liang Che A Wang

(57) ABSTRACT

A method, performed by a mission critical data (MCData) message store entity, of depositing MCData for file distribution (FD). the method includes receiving a MCData deposit an object request message or a MCData retrieve file to store locally request message, wherein the MCData deposit an object request message comprises information regarding the object and the MCData retrieve file to store locally request message comprises information regarding object identifier, based on the MCData deposit an object (Continued)

request message or the MCData retrieve file to store locally request message, retrieving uniform resource locator (URL) of file content in a MCData content server, based on a result of the retrieving, fetching the file content from the MCData content server, storing the file content into a MCData user's storage area in the MCData message store entity, and updating the object with the URL referencing the file content stored in the MCData user's storage area.

16 Claims, 23 Drawing Sheets

Related U.S. Application Data continuation of application No. 17/492,394, filed on Oct. 1, 2021, now Pat. No. 11,729,253.

(51) Int. Cl.
*H04L 67/1097* (2022.01)
*H04L 67/566* (2022.01)

(58) Field of Classification Search
USPC ........................................ 709/217, 218, 219
See application file for complete search history.

(56) References Cited

U.S. PATENT DOCUMENTS

| | | | |
|---|---|---|---|
| 11,122,111 B2 | 9/2021 | Pattan | |
| 2012/0158875 A1* | 6/2012 | Almeida | H04L 67/306 709/206 |
| 2017/0357253 A1* | 12/2017 | Kilpatrick | G05B 19/0428 |
| 2019/0273773 A1 | 9/2019 | Pattan et al. | |
| 2020/0068649 A1 | 2/2020 | Shah | |

FOREIGN PATENT DOCUMENTS

| | | | |
|---|---|---|---|
| CN | 110679163 A | 1/2020 | |
| IN | 201641031911 A | 3/2018 | |
| KR | 20190040234 A | 4/2019 | |
| KR | 20190044616 A | 4/2019 | |
| WO | WO-2018052274 A1 * | 3/2018 | H04L 67/06 |
| WO | 2020040547 A1 | 2/2020 | |
| WO | WO-2022071782 A1 * | 4/2022 | G06F 16/182 |
| WO | WO-2022075690 A1 * | 4/2022 | H04W 4/90 |

OTHER PUBLICATIONS

International Search Report and Written Opinion of the International Searching Authority dated Jan. 5, 2022, in connection with International Application No. PCT/KR2021/013497, 9 pages.
3GPP TR 23.784 V16.0.0 (Jun. 2019), Technical Specification, 3rd Generation Partnership Project; Technical Specification Group Services and System Aspects; Study on discreet listening and logging for mission critical services Release 16), Jun. 2019, 65 pages.
3GPP TS 23.282 V17.4.0 (Sep. 2020), Technical Specification, 3rd Generation Partnership Project; Technical Specification Group Services and System Aspects; Functional architecture and information flows to support Mission Critical Data (MCData); Stage 2 (Release 17), Sep. 2020, 217 pages.
Ericsson, "Providing stored files in MCData content server for FD over MBMS," S6-201089 (revision of S6-xxxxxx), BGPP TSG-SA WG6 Meeting #38-e, e-meeting, Jul. 20-31, 2020, 5 pages.
Ericsson, "Providing stored files in MCData content server for FD over MBMS," S6-201230 (revision of S6-201089), BGPP TSG-SA WG6 Meeting #38-e, e-meeting, Jul. 20-31, 2020, 5 pages.
Supplementary European Search Report dated Jun. 10, 2024, in connection with European Patent Application No. 21876057.7, 9 pages.
Office Action issued Jan. 26, 2026, in connection with Chinese Patent Application No. 202180064732.5, 10 pages.
Notice of Allowance dated Apr. 2, 2026, in connection with European Application No. 21876057.7, 69 pages.
Samsung, "Querying MCData Server to check permission for content removal," S6-200389, 3GPP TSG-SA WG6 Meeting #36-e, E-meeting, Feb. 24-28, 2020, 6 pages.
3GPP TSG CT, "CT aspects of Enhancements to Functional architecture and information flows for Mission Critical Data," CP-193146, 3GPP TSG CT Meeting #86, Sitges, Spain, Dec. 9-10, 2019, 3 pages.
Notice of Allowance dated Jun. 2, 2026, in connection with Chinese Application No. 202180064732.5, 8 pages.
Office Action dated Jun. 30, 2026, in connection with Korean Application No. 10-2023-7005982, 13 pages.
Office Action dated Jul. 16, 2026, in connection with European Application No. 21 876 057.7, 7 pages.

* cited by examiner

METHOD AND DEVICE FOR STORING AND DISTRIBUTING FILE CONTENT IN MC NETWORK

CROSS-REFERENCE TO RELATED APPLICATIONS

This application is a continuation of U.S. application Ser. No. 18/449,607, filed Aug. 14, 2023, which is a continuation of U.S. application Ser. No. 17/492,394 filed Oct. 1, 2021, now U.S. Pat. No. 11,729,253 issued Aug. 15, 2023, which is based on and claims priority under 35 U.S.C. § 119 to Indian Patent Application No. 202041042798 filed on Oct. 1, 2020, Indian Patent Application No. 202041047979 filed on Nov. 3, 2020, and Indian Patent Application No. 202041042798 filed on Sep. 14, 2021, the disclosures of which are herein incorporated by reference in their entirety.

1. FIELD

The present disclosure relates to wireless communication, and more specifically to a method and devices for storing and distributing file content in a mission critical (MC) network.

2. DESCRIPTION OF RELATED ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

Accordingly, the embodiments herein provide a method for storing a file content for FD. The method includes receiving, by a MCData message store entity, a request from one of a MCData client of a MCData User Equipment (UE) and a MCData server, where the request received from the MCData client comprises an object identifier of an object and the request received from the MCData server comprises the object. The method includes determining, by the MCData message store entity, an address of the file content in a MCData content server from the object in the received request or the object identified from the object identifier in the received request. The method includes fetching, by the MCData message store entity, the file content from the MCData content server based on the address of the file content in the MCData content server. The method includes storing, by the MCData message store entity, the file content into a storage area of a MCData user in the MCData message store entity.

In an embodiment, where the method includes updating, by the MCData message store entity, the object with the address referencing the file content stored in the storage area of the MCData user. Further, the method comprises sending, by the MCData message store entity, a MCData retrieve file to store locally response comprises the file content stored in the storage area of the MCData user to the MCData client for the request received from the MCData client.

In an embodiment, where the MCData retrieve file to store locally response comprises an identity of the MCData user, a result indicating a success or a failure of the request, and an address of the file content stored in the MCData user's storage area.

In an embodiment, where the request received from the MCData client comprises an identity of the MCData user, the object identifier of the FD communication object stored in the MCData message store entity, and the address of the file content residing in the MCData content server.

In an embodiment, where the MCData message store entity retrieves the address of the file content residing in the MCData content server from a stored object when the address of the file content in the MCData content server is unavailable in the request received from the MCData client.

In an embodiment, where fetching, by the MCData message store entity, the file content from the MCData content server based on the address of the file content in the MCData content server comprises receiving, by the MCData server, an incoming MCData FD request targeted for a recipient MCData client with a mandatory download indication from the MCData client, sending, by the MCData server, the MCData deposit an object request to the MCData message store entity, detecting, by the MCData server, that the recipient MCData client is unavailable to receive the file content, sending, by the MCData server, a MCData update FD object with a file content request to the MCData message store entity, receiving, by the MCData message store entity, the MCData update FD object with the file content request from the MCData server, and fetching, by the MCData message store entity, the file content from the MCData content server based on the address of the file content in the MCData content server.

In an embodiment, where receiving, by the MCData message store entity, the request from the MCData server comprises receiving, by the MCData server, an incoming MCData FD service request, where the incoming MCData FD service request comprises the address of the file content in the MCData content server, storing, by the MCData server, the service request as the object into the storage area of the MCData user in the MCData message store entity, determining, by the MCData server, whether the service request is authorized, allowing, by the MCData server, the MCData client to continue the MCData FD service request with a recipient MCData client when the service request is authorized, receiving, by the MCData server, a MCData download completed report from the MCData client, and sending, by the MCData server, the request comprises the object identifier of the object and the address of the file content in the MCData content server and a MCData ID of the MCData user to the MCData message store entity for updating the object.

In an embodiment, where the MCData message store entity and the MCData content server mutually communicates through a MCData-FD-7 interface.

In an embodiment, where the request received from the MCData client is a MCData retrieve file to store locally request, and the request received from the MCData server is a MCData deposit an object request.

Accordingly, the embodiments herein provide a method for storing the file content for the FD. The method includes receiving, by the MCData content server, a MCData upload data request comprising the address of the file content residing in the storage area of the MCData user in the MCData message store entity from a media storage client of the MCData UE for uploading the file content. The method includes retrieving, by the MCData content server, the address of the file content residing in the storage area of the MCData user in the MCData message store entity based on the MCData upload data request. The method includes fetching, by the MCData content server, the file content from the storage area of the MCData user in the MCData message store entity using the retrieved address. The method includes storing, by the MCData content server, the file content into a repository of the MCData content server. The method includes sending, by the MCData content server, a MCData upload data response includes an address of the file content stored in the repository of the MCData content server to the media storage client.

In an embodiment, where fetching the file content from the storage area of the MCData user in the MCData message store entity using the retrieved address comprises sending the file content stored in the storage area of the MCData user, upon receiving a file content download request from the MCData content server.

In an embodiment, where the MCData message store entity and the MCData content server mutually communicates through a MCData-FD-7 interface.

Accordingly, the embodiments herein provide the MCData message store entity for storing the file content and the FD. The MCData message store entity includes a FD engine, a memory, a processor, where the FD engine is coupled to the memory and the processor. The FD engine is configured for receiving a request from a MCData client of the MCData UE or the MCData server, where the request received from the MCData client comprises an object identifier of an object and the request received from the MCData server comprises the object. The FD engine is configured for determining the address of the file content in the MCData content server from the object in the received request or the object identified from the object identifier in the received request. The FD engine is configured for fetching the file content from the MCData content server based on the address of the file content in the MCData content server. The FD engine is configured for storing the file content into the storage area of the MCData user in the MCData message store entity.

In an embodiment, where the FD engine is configured for: updating the object with the address referencing the file content stored in the storage area of the MCData user; and sending a MCData retrieve file to store locally response comprising the file content stored in the storage area of the MCData user to the MCData client for the request received from the MCData client.

In an embodiment, where the MCData retrieve file to store locally response comprises an identity of the MCData user, a result indicating a success or a failure of the request, and an address of the file content stored in the MCData user's storage area.

In an embodiment, where the request received from the MCData client comprises an identity of the MCData user, the object identifier of the FD communication object stored in the MCData message store entity, and the address of the file content residing in the MCData content server.

In an embodiment, where the MCData message store entity retrieves the address of the file content residing in the MCData content server from a stored object when the address of the file content in the MCData content server is unavailable in the request received from the MCData client.

In an embodiment, where the fetching the file content from the MCData content server based on the address of the file content in the MCData content server comprises: receiving the MCData update FD object with the file content request from the MCData server; and fetching the file content from the MCData content server based on the address of the file content in the MCData content server, wherein the MCData server is configured for receiving an incoming MCData FD request targeted for a recipient MCData client with a mandatory download indication from the MCData client, sending the MCData deposit an object request to the MCData message store entity, detecting that the recipient MCData client is unavailable to receive the file content, and sending a MCData update FD object with a file content request to the MCData message store entity.

In an embodiment, where the MCData message store entity receives the request from the MCData server, wherein the MCData server is configured for: receiving an incoming MCData FD service request, wherein the incoming MCData FD service request comprises an address of the file content in the MCData content server; storing the service request as an object into the storage area of the MCData user in the MCData message store entity; determining whether the service request is authorized; allowing the MCData client to continue the MCData FD service request with a recipient MCData client when the service request is authorized; receiving a MCData download completed report from the MCData client; and sending the request comprises the object identifier of the object and the address of the file content in the MCData content server and a MCData ID of the MCData user to the MCData message store entity for updating the object.

In an embodiment, where the MCData message store entity and the MCData content server mutually communicates through a MCData-FD-7 interface.

In an embodiment, where the request received from the MCData client is a MCData retrieve file to store locally request, and the request received from the MCData server is a MCData deposit an object request.

Accordingly, the embodiments herein provide the MCData content server for storing the file content and the FD. The MCData content server includes a FD engine, a memory, a processor, where the FD engine is coupled to the memory and the processor. The FD engine is configured for receiving the MCData upload data request comprising the address of the file content residing in the storage area of the MCData user in the MCData message store entity from the media storage client of the MCData UE for uploading the file content. The FD engine is configured for retrieving the address of the file content residing in the storage area of the MCData user in the MCData message store entity based on the MCData upload data request. The FD engine is configured for fetching the file content from the storage area of the MCData user in the MCData message store entity using the retrieved address. The FD engine is configured for storing the file content into the repository of the MCData content server. The FD engine is configured for sending the MCData upload data response includes the address of the file content stored in the repository of the MCData content server to the media storage client.

In an embodiment, where the MCData message store entity and the MCData content server mutually communicates through a MCData-FD-7 interface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
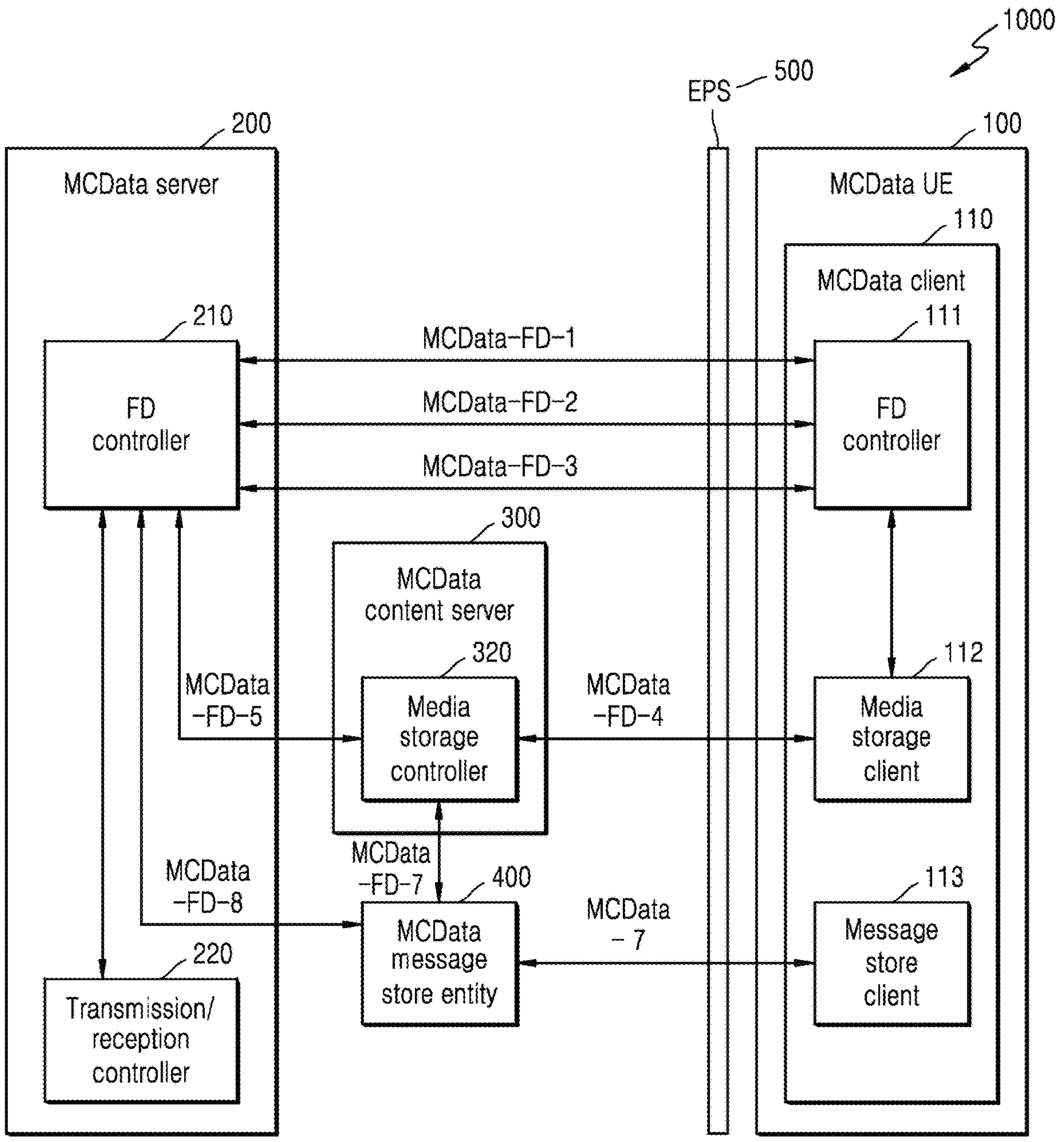
FIG. 1A is a block diagram of a system for storing and distributing file content, according to an embodiment as disclosed herein.

FIGS. 1A through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

16th release onwards of 3rd Generation Partnership Project (3GPP) Technical Specification (TS) 23.282 has defined a Mission Critical Data (MCData) content server and a MCData message store entity. The MCData content server provides a repository in a MCData trust domain allowing authorized MCData users to temporarily store a file that are intended to share to other MCData users. The MCData content server provides a common pool of storage space to the authorized MCData users to use, where no personal storage area is provided in the storage space. The MCData message store entity allows a MCData user having a user account to permanently store a MCData communication into a personal storage area associated with the user account in the MCData message store entity. The personal storage area is identified using the MCData user's MCData ID. The MCData message store entity allows the MCData user to access only the personal storage area that the MCData user is authorized to access.

In case the MCData user wants to share the file that is residing in the MCData message store entity to a recipient, then a MCData client of the MCData user has to upload the file to the repository of the MCData content server. Further, the MCData client needs to share a Uniform Resource Locator (URL) of the file stored in the repository of the MCData content server with the recipient, which is not an optimized way of sharing the file. Since the file is already residing in the MCData message store entity, it is an overhead for the MCData client to again upload the same file to the MCData content server, which leads to wastage of bandwidth. Moreover, existing method does not allow the MCData user to directly distribute the file residing in the personal storage area associated with the user account of the MCData user in the MCData message store entity to other users in an efficient way and there is no procedure defining for depositing a MCData communication as an object into the MCData message store entity. Therefore, it is desired to provide a useful method and/or system as a solution to the aforementioned problems.

The principal object of the embodiments herein is to provide a method and devices for storing and distributing file content in a MC network. A MCData message store entity stores a MCData communication as an object into a personal storage area associated with a user account of a MCData user. Therefore, the object can be further used for distributing the file efficiently.

Another object of the embodiment herein is to provide extensions to a File Distribution (FD) using a Hypertext Transfer Protocol (HTTP) functionality to facilitate the distribution of the file content to a recipient from the personal storage area associated with the user account of the MCData user in the MCData message store entity. Therefore, the file content can be efficiently distributed to the recipient without wasting a bandwidth for downloading the file content from the MCData message store entity and uploading the file content to the MCData content server.

Another object of the embodiment herein is to deposit a FD request and the distributed file content into a personal storage area associated with a user account of the recipient in the MCData message store entity using the HTTP functionality, when the MCData user has requested a mandatory download of the file content and the recipient is unavailable at a time of the MCData communication. Later when available, the recipient can download the file content from the personal storage area associated with the user account of the recipient in the MCData message store entity. Hence, the file content will not be missed by the recipient, which improves a user experience.

Accordingly, the embodiments herein provide a method for storing a file content for FD. The method includes receiving, by a MCData message store entity, a request from one of a MCData client of a MCData User Equipment (UE) and a MCData server, where the request received from the MCData client comprises an object identifier of an object and the request received from the MCData server comprises the object. The method includes determining, by the MCData message store entity, an address of the file content in a MCData content server from the object in the received request or the object identified from the object identifier in the received request. The method includes fetching, by the MCData message store entity, the file content from the MCData content server based on the address of the file content in the MCData content server. The method includes storing, by the MCData message store entity, the file content into a storage area of a MCData user in the MCData message store entity.

Accordingly, the embodiments herein provide a method for storing the file content for the FD. The method includes receiving, by the MCData content server, a MCData upload data request comprising the address of the file content residing in the storage area of the MCData user in the MCData message store entity from a media storage client of the MCData UE for uploading the file content. The method includes retrieving, by the MCData content server, the address of the file content residing in the storage area of the MCData user in the MCData message store entity based on the MCData upload data request. The method includes fetching, by the MCData content server, the file content from the storage area of the MCData user in the MCData message store entity using the retrieved address. The method includes storing, by the MCData content server, the file content into a repository of the MCData content server. The method includes sending, by the MCData content server, a MCData upload data response includes an address of the file content stored in the repository of the MCData content server to the media storage client.

Accordingly, the embodiments herein provide the MCData message store entity for storing the file content and the FD. The MCData message store entity includes a FD engine, a memory, a processor, where the FD engine is coupled to the memory and the processor. The FD engine is configured for receiving a request from a MCData client of the MCData UE or the MCData server, where the request received from the MCData client comprises an object identifier of an object and the request received from the MCData server comprises the object. The FD engine is configured for determining the address of the file content in the MCData content server from the object in the received request or the object identified from the object identifier in the received request. The FD engine is configured for fetching the file content from the MCData content server based on the address of the file content in the MCData content server. The FD engine is configured for storing the file content into the storage area of the MCData user in the MCData message store entity.

Accordingly, the embodiments herein provide the MCData content server for storing the file content and the FD. The MCData content server includes a FD engine, a memory, a processor, where the FD engine is coupled to the memory and the processor. The FD engine is configured for receiving the MCData upload data request comprising the address of the file content residing in the storage area of the MCData user in the MCData message store entity from the media storage client of the MCData UE for uploading the file content. The FD engine is configured for retrieving the address of the file content residing in the storage area of the MCData user in the MCData message store entity based on the MCData upload data request. The FD engine is configured for fetching the file content from the storage area of the MCData user in the MCData message store entity using the retrieved address. The FD engine is configured for storing the file content into the repository of the MCData content server. The FD engine is configured for sending the MCData upload data response includes the address of the file content stored in the repository of the MCData content server to the media storage client.

The proposed method provides several procedures through which FD communication can be stored into the personal storage area associated with an account of the MCData user in the MCData message store entity. The proposed method covers the procedures for storing both incoming and outgoing FD communications. The FD communication referred here includes FD communication using media plane and FD communication using HTTP. Depositing the FD communication by the MCData server is one of a solution which is applicable for the FD communications using the HTTP and media plane. When a MCData user is supported with the MCData message store entity, all outgoing communications of the MCData user shall be stored in the personal storage area associated with an account of the MCData user in the MCData message store entity as per a request of the MCData user.

Unlike existing methods and systems, the MCData message store entity stores a MCData communication as an object into the personal storage area associated with the account of the MCData user in the MCData message store entity. Therefore, the object can be further used for distributing the file content efficiently.

Unlike existing methods and systems, the proposed system provides extensions to the FD using HTTP functionality to facilitate the distribution of the file content to a recipient from the personal storage area associated with the user account of the MCData user in the MCData message store entity. Therefore, the file content can be efficiently distributed to the recipient without wasting bandwidth of a MC network for downloading the file content from the MCData message store entity and uploading the file content to the MCData content server.

Unlike existing methods and systems, the proposed system deposits a FD request and the distributed file content into a personal storage area associated with a user account of the recipient in the MCData message store entity using the HTTP functionality, when the MCData user has requested a mandatory download of the file content and the recipient is unavailable at a time of the MCData communication. Later when available, the recipient can download the file content from the personal storage area associated with the user account of the recipient in the MCData message store entity. Hence, the file content will not be missed by the recipient, which improves a user experience.

Referring now to the drawings, and more particularly to FIGS. 1A through 20, there are shown preferred embodiments.

FIG. 1A is a block diagram of a system (1000) for storing and distributing file content, according to an embodiment as disclosed herein.

An example for the system (1000) is a MC network. In an embodiment, the system (1000) includes a MCData UE (100), a MCData server (200), a MCData content server (300), a MCData message store entity (400) and an Evolved Packet System (EPS) interface (500), where the MCData UE (100) communicates with other entities in the system (1000) via the EPS interface (500). Examples of the MCData UE (100) includes, but not limited to a smart phone, a tablet computer, a personal digital assistance (PDA), a desktop computer, an Internet of Things (IoT), a wearable device, etc. In an embodiment, the MCData UE (100) includes a MCData client (110), where the MCData client (110) includes a FD controller (111), a media storage client (112), and a message store client (113).

In an embodiment, the MCData server (200) includes a FD controller (210), and a transmission/reception controller (220). In an embodiment, the MCData content server (300) includes a media storage controller (320). The FD controller (210) and the FD controller (110) are communicated through a MCData-FD-1, a MCData-FD-2, and a MCData-FD-3 reference points. The MCData message store entity (400) communicates with the FD controller (210) through a MCData-FD-8 reference point. The media storage controller (320) communicates with the media storage client (112), and the FD controller (210), through a MCData-FD-4 reference point, and a MCData-FD-5 reference point, respectively.

The MCData message store entity (400) communicates with the MCData content server (300) and the message store client (113) through a MCData-FD-7 reference point (also called as MCData-FD-7 interface), and a MCData-7 reference point, respectively.

The MCData-FD-7 reference point is used by the media storage controller (320) to fetch the file content residing in the MCData message store entity (400) and store the fetched file content into a repository (331) (refer FIG. 1B) for distribution. The MCData-FD-7 reference point is also used by the MCData message store entity (400) to download the file content from the media storage controller (320) and store the downloaded file content into a MCData user's message store account. The MCData-FD-7 reference point uses a HTTP reference point. The MCData-FD-7 reference point carries uplink and downlink unicast file/object data between the media storage controller (320) of the MCData content server (300), and the MCData message store entity (400). The MCData-FD-7 reference point supports the MCData message store entity (400) to upload the file contents to the MCData content server (300).

The MCData-FD-7 reference point supports transport of the SIP messages. The MCData-FD-7 reference point uses HTTP for retrieving the object from MCData message store entity (400) and updating the object residing in MCData message store entity (400). The MCData-FD-7 reference point uses HTTP uploading or downloading the file from message store for uploading the file/object contents to the MCData content server (300) or to download the file content from MCData content server (300). The MCData-FD-7 reference point is used by the message store client (113) to request the MCData message store entity (400) to copy the object/file content from the MCData user's account to the MCData content server (300).

Although the FIG. 1A shows the hardware components of the system (1000) but it is to be understood that other embodiments are not limited thereon. In other embodiments, the system (1000) may include less or more number of components. Further, the labels or names of the components are used only for illustrative purpose and does not limit the scope of the disclosure. One or more components can be combined together to perform same or substantially similar function for storing and distributing the file content.

Figure 1B:
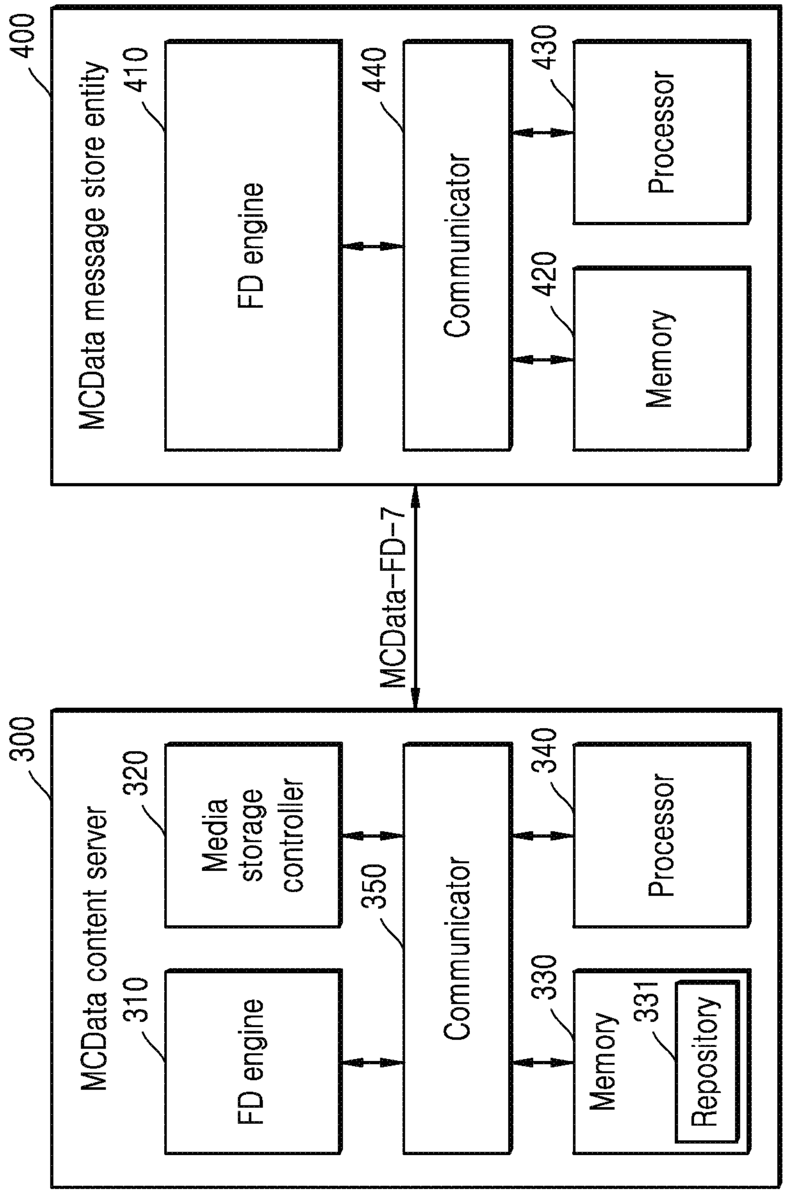
FIG. 1B is a block diagram of a MCData message store entity and a MCData content server in the system, according to an embodiment as disclosed herein.

FIG. 1B is a block diagram of the MCData message store entity (400) and the MCData content server (300) in the system (1000), according to an embodiment as disclosed herein. In an embodiment, the MCData message store entity (400) includes a FD engine (410), a memory (420), a processor (430) and a communicator (440), where the FD engine (410) is coupled to the memory (420) and the processor (430).

The memory (420) stores instructions to be executed by the processor (430). The memory (420) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (420) may, in some examples, be considered a non-transitory storage medium. The term “non-transitory” may indicate that the storage medium is not embodied in a carrier wave or a propagated signal. However, the term “non-transitory” should not be interpreted that the memory (420) is non-movable. In some examples, the memory (420) can be configured to store larger amounts of information than its storage space. In certain examples, a non-transitory storage medium may store data that can, over time, change (e.g., in Random Access Memory (RAM) or cache). The memory (420) can be an internal storage unit or it can be an external storage unit of the MCData message store entity (400), a cloud storage, or any other type of external storage.

The processor (430) is configured to execute instructions stored in the memory (420). The processor (430) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (430) may include multiple cores to execute the instructions.

The communicator (440) is configured for communicating internally between hardware components in the MCData message store entity (400). Further, the communicator (440) is configured to facilitate the communication between the MCData message store entity (400) and other devices via one or more networks (e.g., Radio technology). The communicator (440) includes an electronic circuit specific to a standard that enables wired or wireless communication.

The FD engine (410) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The FD engine (410) receives a request from the MCData client (110) or the MCData server (200). In an embodiment, the MCData server (200) receives an incoming MCData FD service request, where the incoming MCData FD service request comprises an address of the file content in the MCData content server (300). A Uniform Resource Locator (URL) is an example of the address. Further, the MCData server (200) stores the service request as an object into the storage area of the MCData user in the MCData message store entity (400). Further, the MCData server (200) determines whether the service request is authorized. Further, the MCData server (200) allows the MCData client (110) to continue the MCData FD service request with a recipient MCData client when the service request is authorized. Further, the MCData server (200) receives a MCData download completed report from the MCData client (110). Further, the MCData server (200) sends the request comprises the object identifier of the object and the address of the file content in the MCData content server (300) and a MCData ID of the MCData user to the MCData message store entity (400) for updating the object.

In an embodiment, the request received from the MCData client (110) is a MCData retrieve file to store locally request that comprises an object identifier of an object. In another embodiment, the request received from the MCData server (200) is a MCData deposit an object request that comprises the object. In another embodiment, the request received from the MCData client (110) comprises an identity of the MCData user, an object identifier of the FD communication object stored in the MCData message store entity (400), and an address of the file content residing in the MCData content server (300). The FD engine (410) determines the address of the file content in a MCData content server (300) from the object in the received request or the object identified from the object identifier in the received request.

In another embodiment, the FD engine (410) determines the address of the file content residing in the MCData content server (300) from a stored object when the address of the file content in the MCData content server (300) is unavailable in the request received from the MCData client (110). The FD engine (410) fetches the file content from the MCData content server (300) based on the address of the file content in the MCData content server (300). The FD engine (410) stores the file content into a storage area of the MCData user in the MCData message store entity (400). The FD engine (410) updates the object with the address referencing the file content stored in the storage area of the MCData user. The FD engine (410) sends a MCData retrieve file to store locally response comprises the file content stored in the storage area of the MCData user to the MCData client (110) for the request received from the MCData client (110). In an embodiment, the MCData retrieve file to store locally response comprises the identity of the MCData user, a result indicating a success or a failure of the request, and the address of the file content stored in the MCData user's storage area.

In an embodiment, the MCData server (200) receives an incoming MCData FD request targeted for a recipient MCData client with a mandatory download indication from the MCData client (110). Further, the MCData server (200) sends a MCData deposit an object request to the MCData message store entity (400). Further, the MCData server (200) detects that the recipient MCData client (110) is unavailable to receive the file content. Further, the MCData server (200) sends a MCData update FD object with a file content request to the MCData message store entity (400). Further, the FD engine (410) receives the MCData update FD object with the file content request from the MCData server (200). Further, the FD engine (410) fetches the file content from the MCData content server (300) based on the address of the file content in the MCData content server (300).

In another embodiment, the MCData content server (300) includes a FD engine (310), a media storage controller (320), a memory (330), a processor (340), and a communicator (350), where the memory (330) includes a repository (331). The memory (330) stores instructions to be executed by the processor (340). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term “non-transitory” may indicate that the storage medium is not embodied in a carrier wave or a propagated signal. However, the term “non-transitory” should not be interpreted that the memory (330) is non-movable. In some examples, the memory (330) can be configured to store larger amounts of information than its storage space. In certain examples, a non-transitory storage medium may store data that can, over time, change (e.g., in Random Access Memory (RAM) or cache). The memory (330) can be an internal storage unit or it can be an external storage unit of the MCData content server (300), a cloud storage, or any other type of external storage.

The processor (340) is configured to execute instructions stored in the memory (330). The processor (340) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (340) may include multiple cores to execute the instructions.

The communicator (350) is configured for communicating internally between hardware components in the MCData content server (300). Further, the communicator (350) is configured to facilitate the communication between the MCData content server (300) and other devices via one or more networks (e.g., Radio technology). The communicator (350) includes an electronic circuit specific to a standard that enables wired or wireless communication.

The FD engine (310) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The FD engine (310) receives a MCData upload data request comprising an address of the file content residing in the storage area of the MCData user in the MCData message store entity (400) from the media storage client (112) of the MCData UE (100) for uploading the file content. Further, the FD engine (310) retrieves the address of the file content residing in the storage area of the MCData user in the MCData message store entity (400) based on the MCData upload data request. Further, the FD engine (310) fetches the file content from the storage area of the MCData user in the MCData message store entity (400) using the retrieved address. Further, the FD engine (310) stores the file content into the repository (331) of the MCData content server (300). Further, the FD engine (310) sends the MCData upload data response includes the address of the file content stored in the repository (331) of the MCData content server (300) to the media storage client (112).

Although the FIG. 1B shows the hardware components of the MCData message store entity (400) and the MCData content server (300) but it is to be understood that other embodiments are not limited thereon. In other embodiments, the MCData message store entity (400) and the MCData content server (300) may include less or more number of components. Further, the labels or names of the components are used only for illustrative purpose and does not limit the scope of the disclosure. One or more components can be combined together to perform same or substantially similar function for storing and distributing the file content.

Figure 2A:
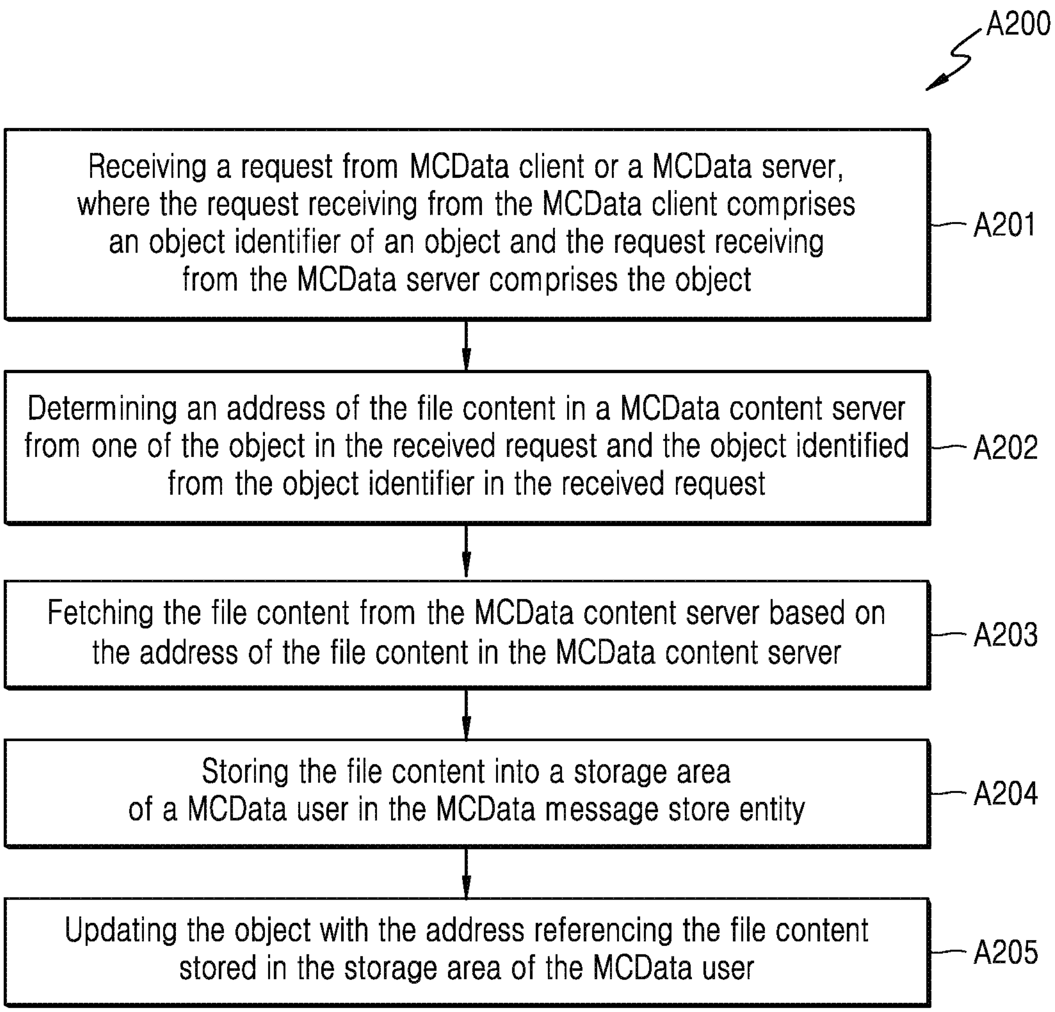
FIG. 2A is a flow diagram illustrating a method for storing and distributing the file content, according to an embodiment as disclosed herein.

FIG. 2A is a flow diagram (A200) illustrating a method for storing and distributing the file content, according to an embodiment as disclosed herein. In an embodiment, the method allows the FD engine (410) to perform steps A201-A205 of the flow diagram (A200). At step A201, the method includes receiving the request from the MCData client (110) or the MCData server (200), where the request received from the MCData client (110) comprises the object identifier of the object and the request received from the MCData server (200) comprises the object. At step A202, the method includes determining the address of the file content in the MCData content server (300) from the object in the received request or the object identified from the object identifier in the received request. At step A203, the method includes fetching the file content from the MCData content server (300) based on the address of the file content in the MCData content server (300). At step A204, the method includes storing the file content into the storage area of the MCData user in the MCData message store entity (400). At step A205, the method includes updating the object with the address referencing the file content stored in the storage area of the MCData user.

Figure 2B:
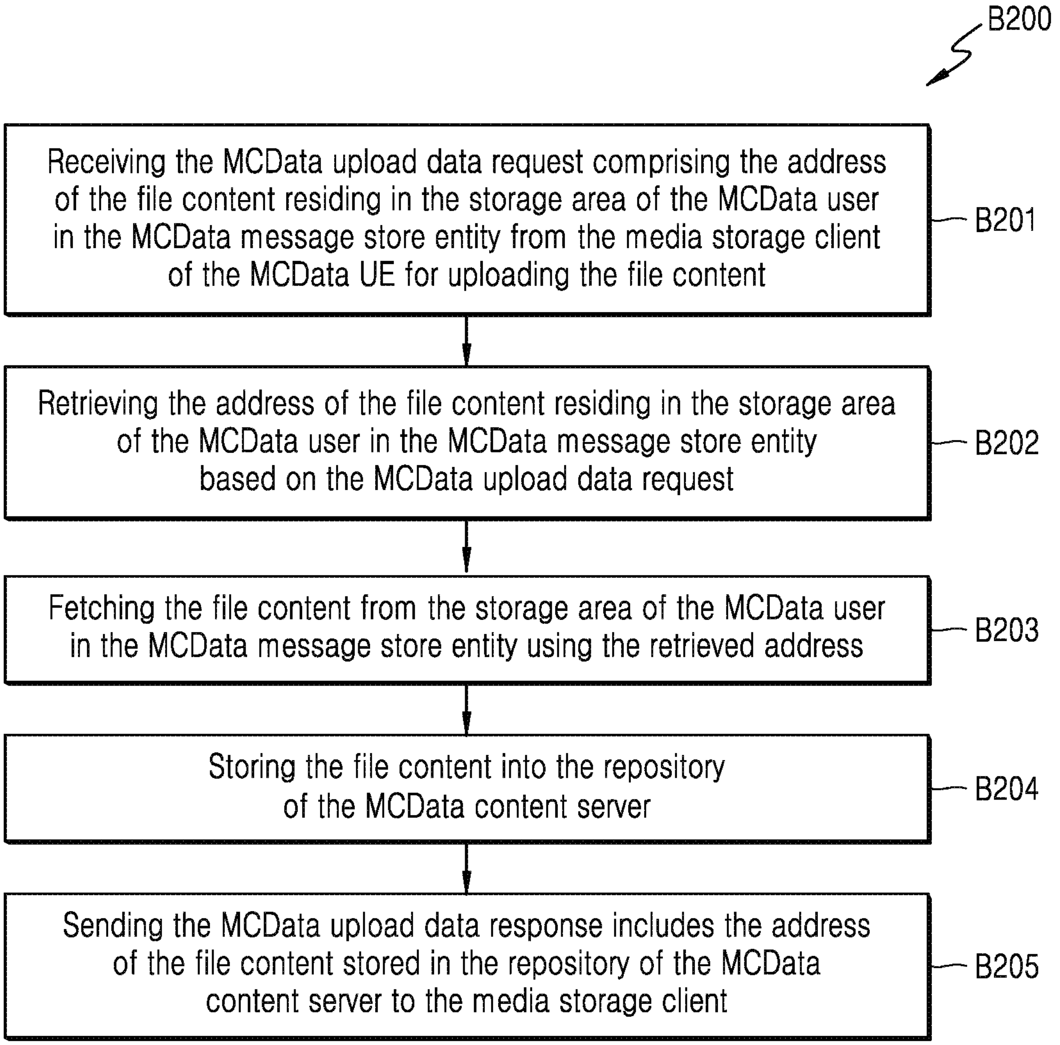
FIG. 2B is a flow diagram illustrating a method for storing and distributing the file content, according to another embodiment as disclosed herein.

FIG. 2B is a flow diagram (B200) illustrating a method for storing and distributing the file content, according to another embodiment as disclosed herein. In an embodiment, the method allows the FD engine (310) to perform steps B201-B205 of the flow diagram (B200). At step B201, the method includes receiving the MCData upload data request comprising the address of the file content residing in the storage area of the MCData user in the MCData message store entity (400) from the media storage client (112) of the MCData UE (100) for uploading the file content. At step B202, the method includes retrieving the address of the file content residing in the storage area of the MCData user in the MCData message store entity (400) based on the MCData upload data request. At step B203, the method includes fetching the file content from the storage area of the MCData user in the MCData message store entity (400) using the retrieved address. At step B204, the method includes storing the file content into the repository (331) of the MCData content server (300). At step B205, the method includes sending the MCData upload data response includes the address of the file content stored in the repository (331) of the MCData content server (300) to the media storage client (112).

The various actions, acts, blocks, steps, or the like in the flow diagrams (A200, B200) may be performed in the order presented, in a different order or simultaneously. Further, in some embodiments, some of the actions, acts, blocks, steps, or the like may be omitted, added, modified, skipped, or the like without departing from the scope of the disclosure.

Figure 3:
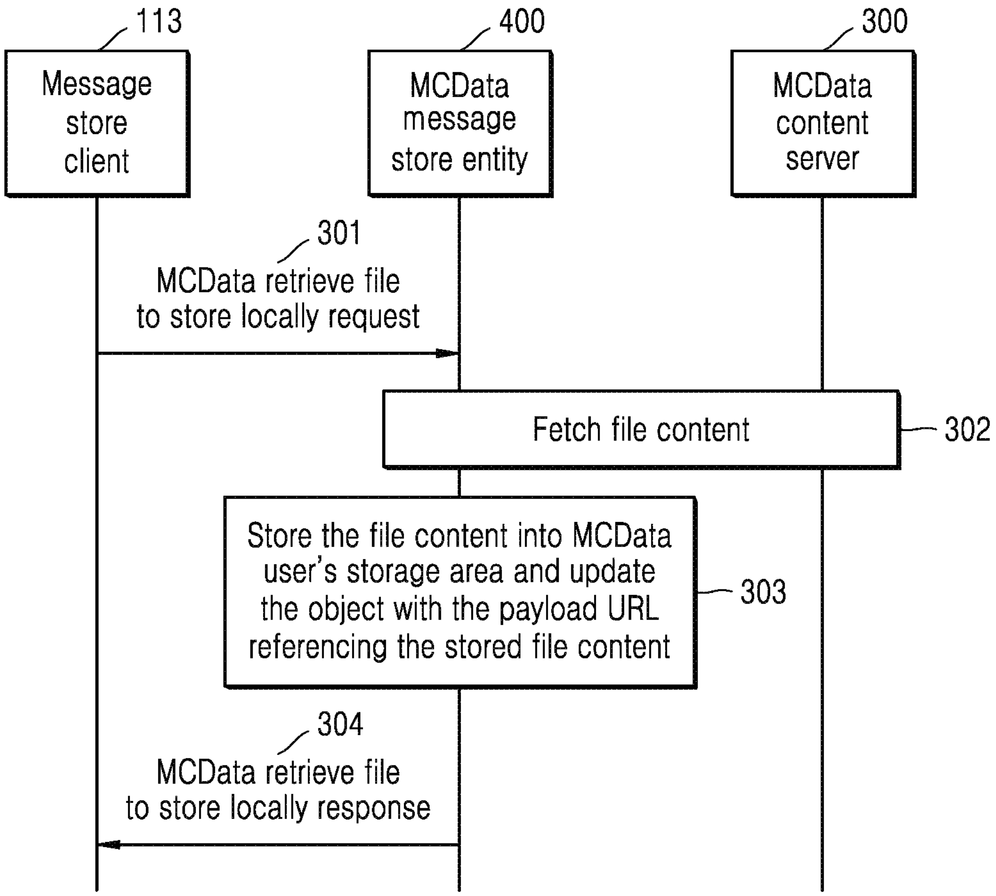
FIG. 3 is a sequence diagram illustrating a method for providing an address of the file content referencing a stored file content in a storage area of the MCData user in the MCData message store entity, according to an embodiment as disclosed herein.

FIG. 3 is a sequence diagram illustrating a method for providing the address of the file content referencing the stored file content in the storage area of the MCData user in the MCData message store entity (400), according to an embodiment as disclosed herein. The MCData server (200) deposits the FD communication using an incoming/outgoing HTTP request into the MCData user's storage area in the MCData message store entity (400). The FD request using the HTTP does not contain the file content, but instead the FD request using the HTTP contains the URL of the file content residing in the MCData content server (300). The file content also needs to be stored in the MCData user's storage area, so that the file content can be archived and enables the MCData user to forward/resend the file content to other MCData users or a MCData group from the MCData user's storage area. The file content stored in the MCData message store entity (400) is available as long as the MCData message store entity (400) deletes the file content based on a service provider policy or the MCData user deletes the file content.

The method of requesting by message store client (113) of the MCData client (110) to the MCData message store entity (400) for downloading the file content from the MCData content server (300) and storing the file content in the MCData user's storage area is illustrated in the FIG. 3. This method is applicable to both the outgoing and incoming FD requests. In case of the outgoing FD request, the MCData client (110) requests the MCData message store entity (400)

to update the MCData user's storage area with the file content after issuing the FD request. In case of the incoming FD request, the message store client (113) of the MCData client (110) requests the MCData message store entity (400) to update the MCData user's storage area with the file content after downloading the file from the MCData content server (300).

Preconditions in this embodiment are: a successful authentication and authorization have been performed between the message store client (113) and the MCData message store entity (400), the MCData client (110) is part of the MCData FD communication using the HTTP either as an originator or recipient, the MCData user has requested to store the user's MCData communication, and the message store client (113) knows the object identifier of the stored object.

The MCData user would like to store the distributed file content or the downloaded file content into the storage area of the MCData user in the MCData message store entity (400). Therefore, the MCData user initiates the MCData retrieve file to store locally request towards the MCData message store entity (400) using the message store client (113) at 301. The object identifier corresponding to the stored MCData FD communication is included in the request. At 302, the MCData message store entity (400) retrieves the file URL from the stored object and fetches the file content from the MCData content server (300). At 303, the MCData message store entity (400) stores the file content into the MCData user's storage area and updates the object with the URL referencing the file content stored in the MCData user's storage area. At 304, the MCData message store entity (400) provides the MCData retrieve file to store locally response to the message store client (113). This response includes the URL of the file being stored in the MCData user's storage area.

The MCData message store entity (400) stores the file content and generates the URL in such a way that other functional entities like the MCData content server (300) can access the file content using the URL. Table 1 describes information elements in the MCData retrieve file to store locally request.

TABLE 1

| Information element | Status | Description |
|---|---|---|
| MCData ID | M | The identity of the MCData user |
| Object identifier | M | The object identifier of the FD communication object stored in the MCData message store entity (400) |
| File URL | O | The URL of the file which needs to be stored in the MCData user's storage area |

If the file URL information element is not present, then the MCData message store entity (400) extracts the file URL from the stored object identified by the object identifier information element. Table 2 describes information elements in the MCData retrieve file to store locally response.

TABLE 2

| Information element | Status | Description |
|---|---|---|
| MCData ID | M | The identity of the MCData user |
| Result | M | Indicates success or failure of the MCData update FD object with file content request |

TABLE 2-continued

| Information element | Status | Description |
|---|---|---|
| Content reference | O | URL reference to the file content stored in the MCData user's storage area |

The content reference information element shall be present if the file content is stored into the MCData user's storage area successfully. A name of the request and the response shown in Table 1 and Table 2 could be anything that carries the actual information required for the MCData message store entity (400) to retrieve the file content from the MCData content server (300) and store the file content in the storage area of the MCData user.

Figure 4:
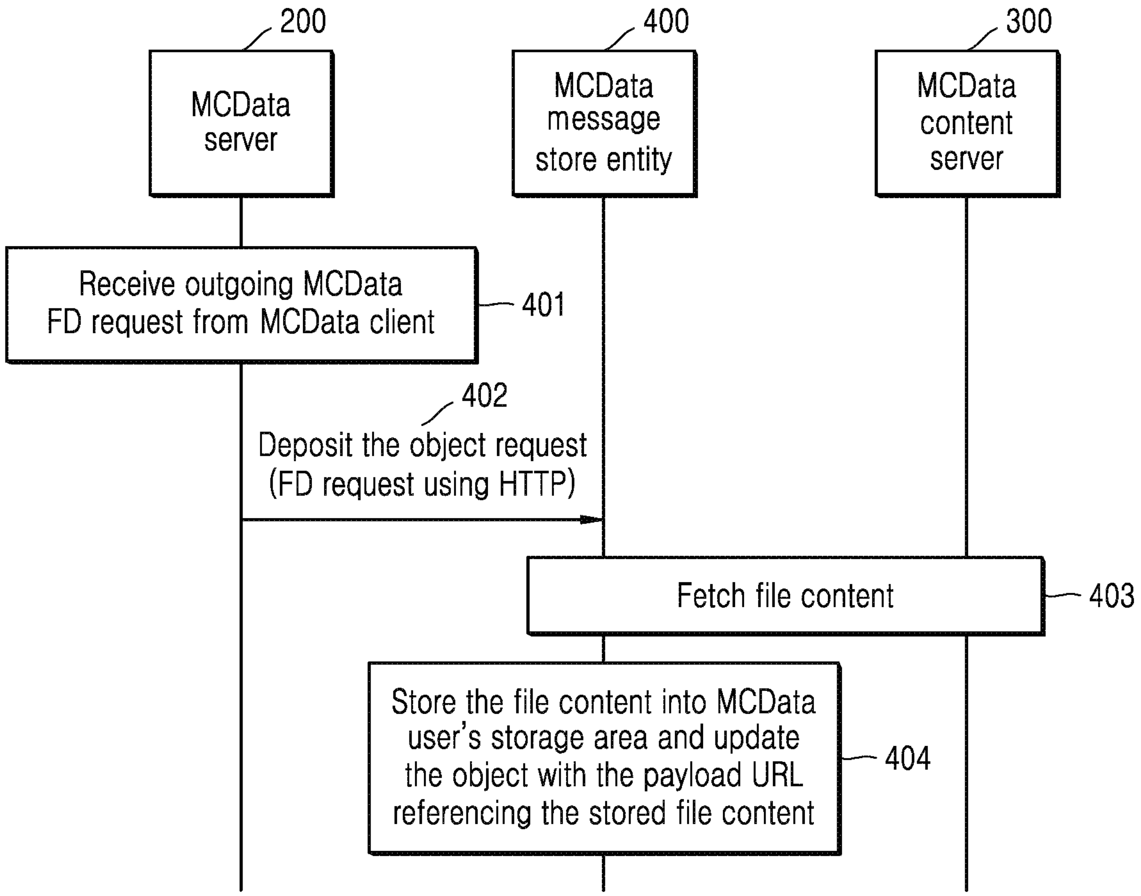
FIG. 4 is a sequence diagram illustrating a method for updating an object stored in the storage area of the MCData user with the file content for an outgoing FD communication, according to an embodiment as disclosed herein.

FIG. 4 is a sequence diagram illustrating a method for updating the object stored in the storage area of the MCData user with the file content for the outgoing FD communication (i.e., distributed by the MCData user), according to an embodiment as disclosed herein. Preconditions in this embodiment are: the MCData user has an account created with the MCData message store entity (400), and the MCData user has requested to store the MCData user's MCData communication. At 401, the MCData server (200) receives an outgoing MCData FD request from the MCData client (110) which needs to be sent to other MCData users or MCData group. At 402, the MCData server (200) sends a deposit the object request to the MCData message store entity (400) and stores the FD communication as an object to the MCData user account in the MCData message store entity (400). At 403, the MCData message store entity (400) identifies that the object being deposited by the MCData server (200) is of the FD communication type (i.e., outgoing) and hence downloads the file content from the MCData content server (300) using the URL specified in the FD communication object. At 404, the MCData message store entity (400) stores the retrieved file content into the MCData user's storage area and updates the object with the URL referencing the file content stored in the MCData user's storage area.

Figure 5:
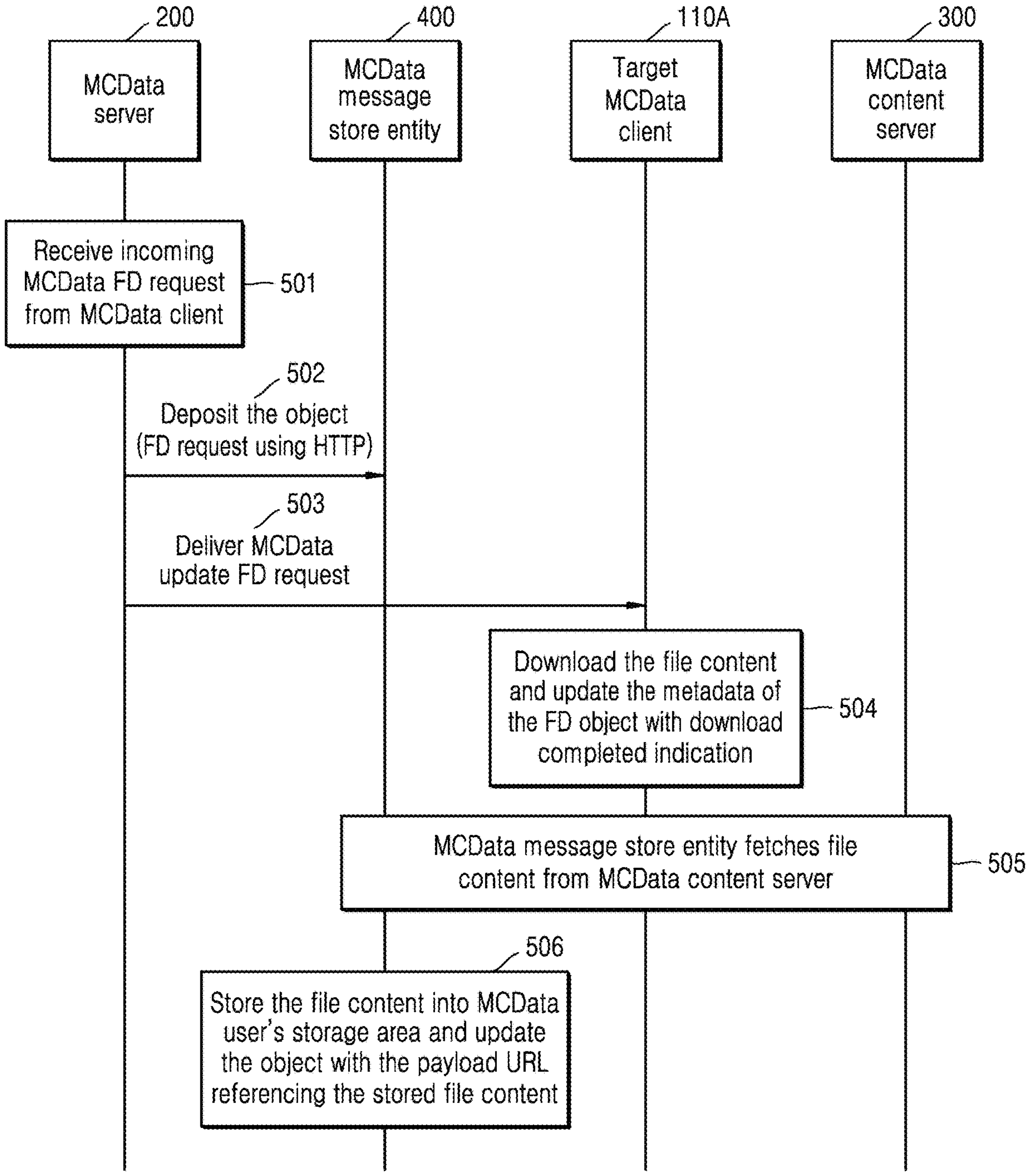
FIG. 5 is a sequence diagram illustrating a method for updating the object stored in the storage area of the MCData user with the file content for an incoming FD communication, according to an embodiment as disclosed herein.

FIG. 5 is a sequence diagram illustrating a method for updating the object stored in the storage area of the MCData user with the file content for the incoming FD communication, according to an embodiment as disclosed herein. Preconditions in this embodiment are: the MCData user has the account created with the MCData message store entity (400), the MCData user has requested to store the MCData user's MCData communication, and the message store client (113) knows the object identifier of the stored object.

At 501, the MCData server (200) receives the incoming MCData FD request from the MCData client (110) which needs to be sent towards the target MCData client (i.e., the recipient MCData client) (110A). At 502, the MCData server (200) stores the FD communication as the object into the MCData user's account in the MCData message store entity (400). At 503, the MCData server (200) delivers the FD communication request using HTTP to the target MCData client (110A). At 504, the target MCData client (110A) downloads the file content from the MCData content server (300) and updates the FD communication object metadata indicating that the MCData client (110A) has downloaded the file. At 505, upon identifying that the to the target MCData client (110A) has downloaded the file, the MCData message store entity (400) retrieves the file content from the MCData content server (300). At 506, the MCData message store entity (400) stores the retrieved file content into the MCData user's storage area and updates the object with the URL referencing the file content stored in the MCData user's storage area.

Whenever the file content is deposited into the MCData user's storage area, the message store client (113) needs to know the URL. So that the message store client (113) can use the same URL to forward/resend the file content to other MCData users or the MCData group. The method allows the message store client (113) to aware of the file URL residing in the MCData user's storage are in the following embodiments.

In an embodiment, the MCData update FD object with the file content response is issued towards the message store client (113) for the MCData update FD object with file content request that includes the URL referencing the content stored in the MCData user's storage area. In another embodiment, the MCData message store entity (400) updates the stored FD communication object with the URL pointing to the file content stored in the MCData user's storage area. The message store client (113) receives these changes to the object by subscribing to the changes of the objects residing in the MCData user's storage area. In another embodiment, the MCData message store entity (400) notifies the message store client (113) whenever the FD communication object is updated with the URL referencing to the file content retrieved by the MCData message store entity (400) from the content server (300) and stored into the MCData user's storage area. Table 3 describes information elements in the MCData FD object updated notification sent by the MCData message store entity (400) to the message store client (113).

TABLE 3

| Information element | Status | Description |
|---|---|---|
| MCData ID | M | The identity of the MCData user to whom this notification is being sent |
| Object identifier | M | The object identifier of the object stored in the MCData message store entity (400) which is updated with the URL referencing the file content stored in the MCData user's storage area |
| Content reference | M | URL referencing the file content stored in the MCData user's storage area |

Figure 6:
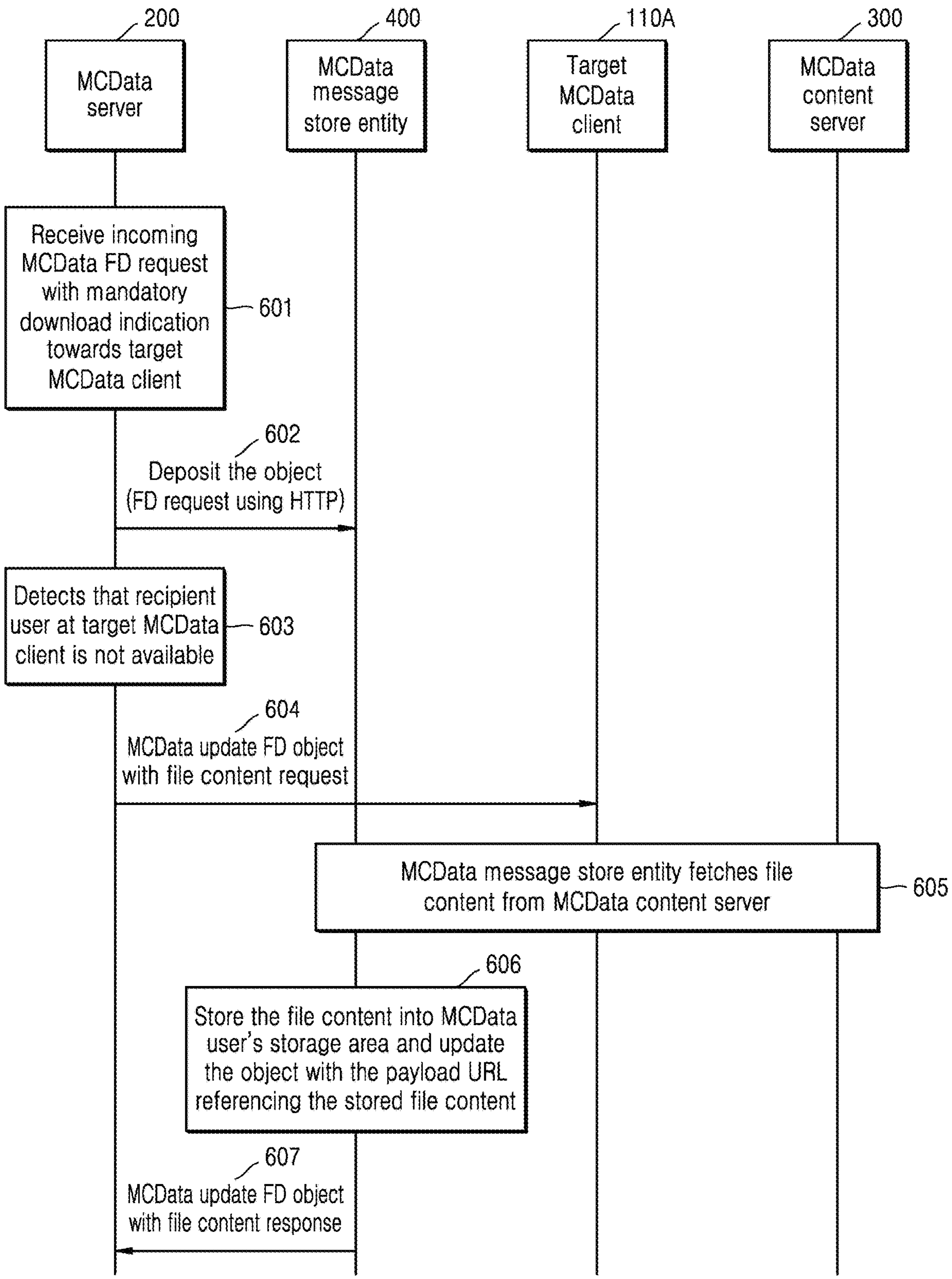
FIG. 6 is a sequence diagram illustrating a method for depositing an FD communication and the file content into a storage area of a recipient MCData user in the MCData message store entity when the recipient MCData user is unavailable, according to an embodiment as disclosed herein.

FIG. 6 is a sequence diagram illustrating a method for depositing an FD communication and the file content into the storage area of the recipient MCData user in the MCData message store entity (400) when the recipient MCData user is unavailable, according to an embodiment as disclosed herein. The MCData server (200) requesting the MCData message store entity (400) to download the file contents from the MCData content server (300). Currently, the MCData server (200) may store the FD communication data in a temporary storage if the recipient MCData user is not available at the time of data delivery of the file content. Sometimes the MCData client (110) distributing/transmitting the file content may indicate the mandatory download indication which compels the receiving MCData client (110) to receive/download the data automatically without being able to reject or defer the communication request. The proposed method allows the MCData server (200) to deposit the FD communication object into the recipient MCData user storage area, and request the MCData message store entity (400) to download the file content from the MCData content server (300), instead of storing the FD communication data in the temporary storage. Therefore, the MCData server (200) does not need to hold the communication data, and the recipient MCData user is always guaranteed to receive the shared file contents when the recipient MCData user becomes available.

At 601, the MCData server (200) receives the incoming MCData FD request with the mandatory download indication which needs to be sent towards the target MCData client (110A). At 602, the MCData server (200) stores the FD communication as the object into the MCData user's account in the MCData message store entity (400). At 603, the MCData server (200) detects that the recipient MCData user at the target MCData client (110A) is not available at the time of data delivery. At 604, the MCData server (200) requests the MCData message store entity (400) to retrieve the file content from the MCData content server (300) and store the retrieved file content by sending the MCData update FD object with the file content request. At 605, the MCData message store entity (400) retrieves the file content from the MCData content server (300). At 606, the MCData message store entity (400) stores the retrieved file content into the MCData user's storage area and updates the object with the URL referencing the file content stored in the MCData user's storage area. At 607, the MCData message store entity (400) provides the MCData update FD object with file content response to the MCData server (200).

Figure 7:
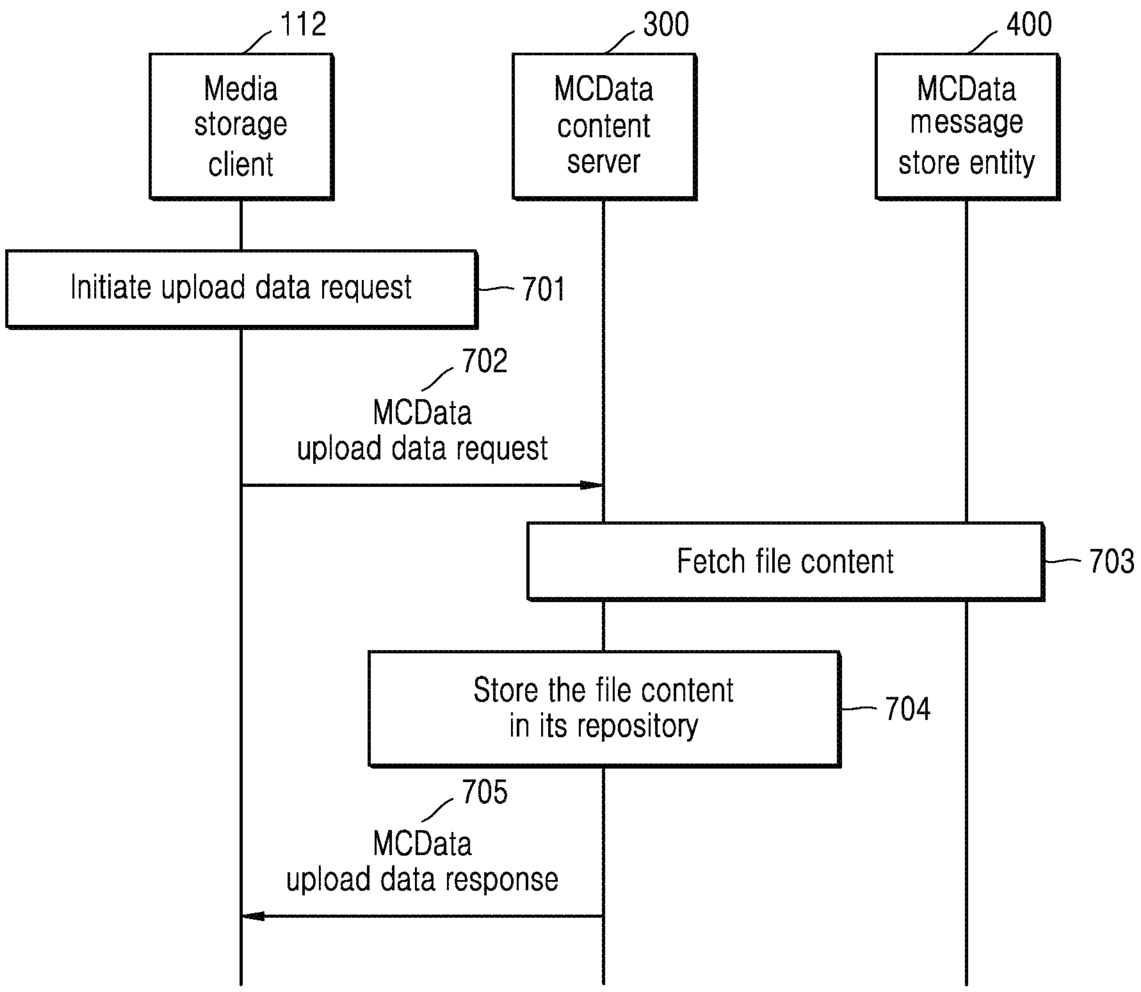
FIG. 7 is a sequence diagram illustrating a method for uploading the file content from the storage area of the MCData user to the MCData content server, according to an embodiment as disclosed herein.

FIG. 7 is a sequence diagram illustrating a method for uploading the file content from the storage area of the MCData user to the MCData content server (300), according to an embodiment as disclosed herein. Preconditions in this embodiment are: the MCData user of the media storage client (112) is registered for receiving the MCData service, and the MCData content server (300) has the ability to verify if a requesting MCData user is authorized to upload.

At 701, the MCData user at the media storage client (112) initiates the file upload request of the file residing in the MCData message store entity account of the MCData user. At 702, the URL of the file which needs to be retrieved from the MCData message store entity account of the MCData user is sent to the media storage controller (320) of the MCData content server (300) using the MCData upload data request. At 703, the MCData content server (300) fetches the file content from the MCData message store entity account of the MCData user using the URL provided in the MCData upload data request. At 704, the MCData content server (300) stores the retrieved file content into the repository (331). At 705, the MCData content server (300) provides the MCData upload data response indicating a success along with the file URL or a failure to the media storage client (112). Table 4 describes information elements in the MCData upload request, where either content or content reference information element is present in the MCData upload request.

TABLE 4

| Information element | Status | Description |
|---|---|---|
| MCData ID | M | The identity of the MCData user uploading data |
| Content | O | Content to upload |
| Content reference (object identifier) | O | URL reference to the content or the object identifier of the object residing in MCData message store entity (400) account which contains the file content to be distributed |
| Emergency indicator | O | Indicates that the data request is for MCData emergency communication |

Figure 8:
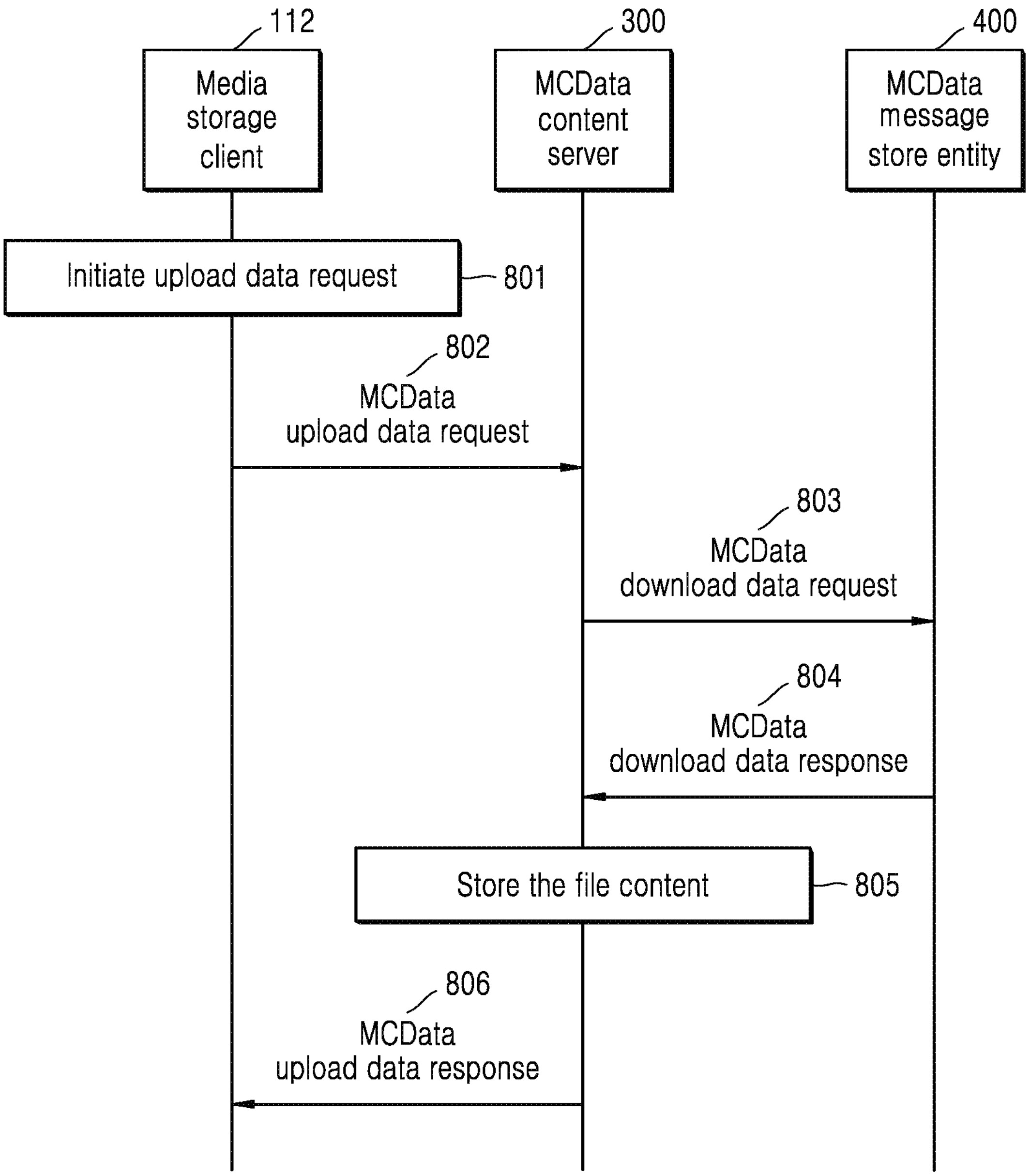
FIG. 8 is a sequence diagram illustrating an alternate method for uploading the file content from the storage area of the MCData user to the MCData content server, according to an embodiment as disclosed herein.

FIG. 8 is a sequence diagram illustrating an alternate method for uploading the file content from the storage area of the MCData user to the MCData content server (300), according to an embodiment as disclosed herein. Preconditions in this embodiment are: the MCData user of the media storage client (112) is registered for receiving the MCData service, and the MCData content server (300) has the ability to verify if a requesting MCData user is authorized to upload.

At 801, the MCData user at the media storage client (112) initiates an upload data request for uploading the file content residing in the MCData message store entity account of the MCData user. At 802, the URL of the file content which needs to be retrieved from the MCData message store entity account of the MCData user is sent to the media storage controller (320) of the MCData content server (300) using the MCData upload data request. At 803, the MCData content server (300) sends a MCData download data request to the MCData message store entity (400) for downloading the file content available at the URL received in MCData upload data request. At 804, the MCData message store entity (400) provides a MCData download data response including the file content to the MCData content server (300). At 805, the MCData content server (300) stores the retrieved file content into the repository (301). At 806, the MCData content server (300) provides the MCData upload data response indicating the success along with the file URL or the failure to the media storage client (112).

Figure 9:
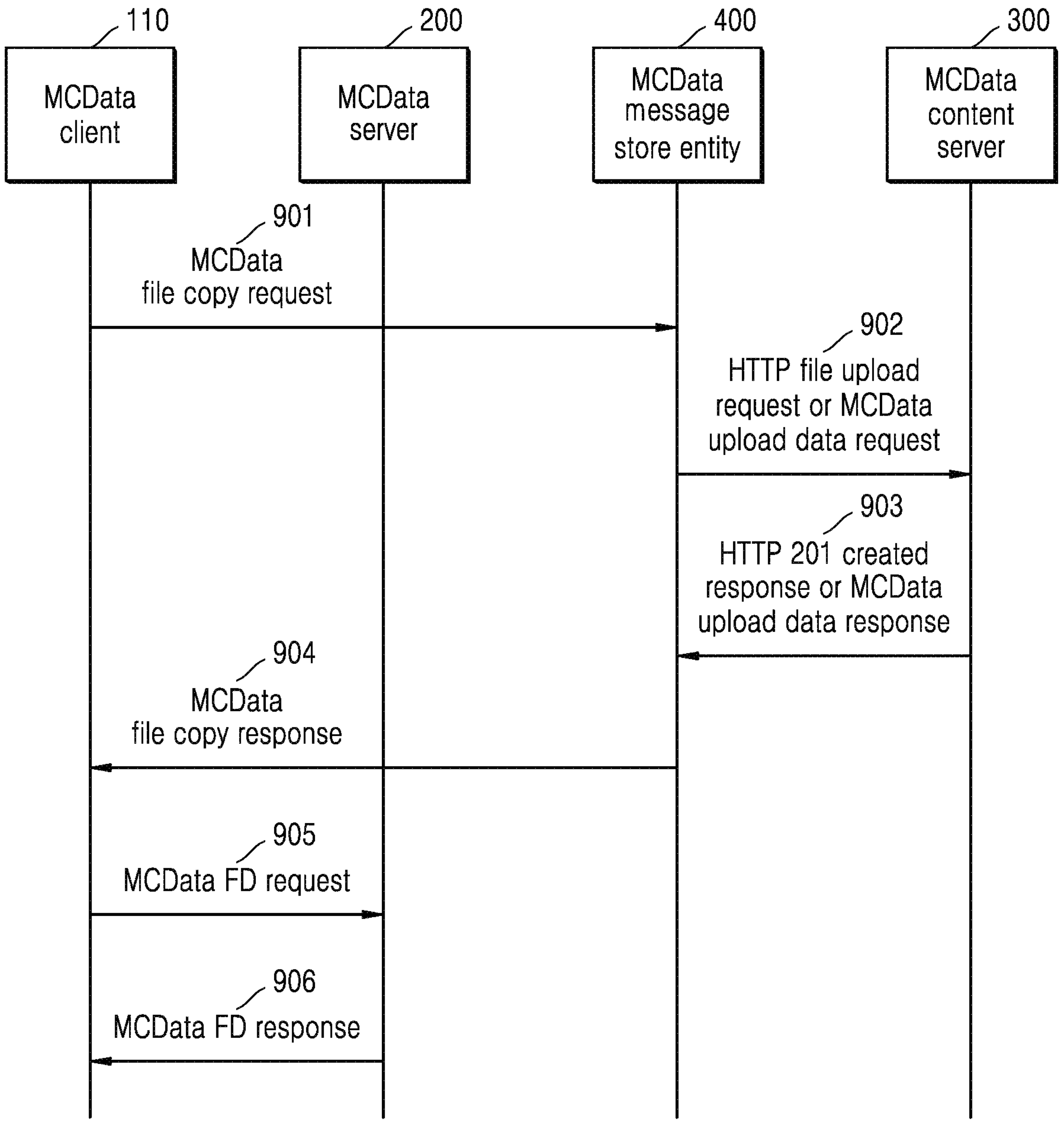
FIG. 9 is a sequence diagram illustrating a method of uploading the file content to the MCData content server by the MCData message store entity, according to an embodiment as disclosed herein.

FIG. 9 is a sequence diagram illustrating a method of uploading the file content to the MCData content server (300) by the MCData message store entity (400), according to an embodiment as disclosed herein. At 901, the MCData client (110) sends a MCData file copy request to the MCData message store entity (400), where the MCData file copy request includes the object identifier corresponding to the file content and the destination URL where the file content has to be copied which is URL of the MCData content server (300). In an embodiment, the MCData file copy request is a HTTP request or REST API request or a SIP message. In an embodiment, the object identifier or the URL of the file content should be conveyed to the MCData message store entity (400) which enables the MCData message store entity (400) to copy/upload that file content to the MCData content server (300).

At 902, upon receiving the MCData file copy request, the MCData message store entity (400) performs necessary authorization check. If the authorization succeeds, the MCData message store entity (400) uploads the file content from the account of the user in the MCData message store entity (400) to the MCData content server (300). At 903, the MCData content server (300) provides response indicating success along with the file URL where the file content is stored or failure to the MCData message store entity (400). At 904, the MCData message store entity (400) provides the MCData file copy response indicating the success along with the URL of the file content stored in MCData content server (300)). At 905, in response to receiving the file URL from the MCData message store entity (400), the MCData client (110) issues a MCData FD request with the URL of the file content residing in the MCData content server (300). The MCData server (200) provides a MCData FD response to the MCData client (110). Table 5 describes information elements in the MCData file copy request.

TABLE 5

| Information element | Status | Description |
|---|---|---|
| MCData ID | M | The identity of the MCData user requesting to copy the file content |
| Functional alias | O | The associated functional alias of the MCData user MCData user requesting to copy the file content |
| Content reference or object identifier | M | URL reference to the content or the object identifier of the object which contains the file content to be copied |

Figure 10:
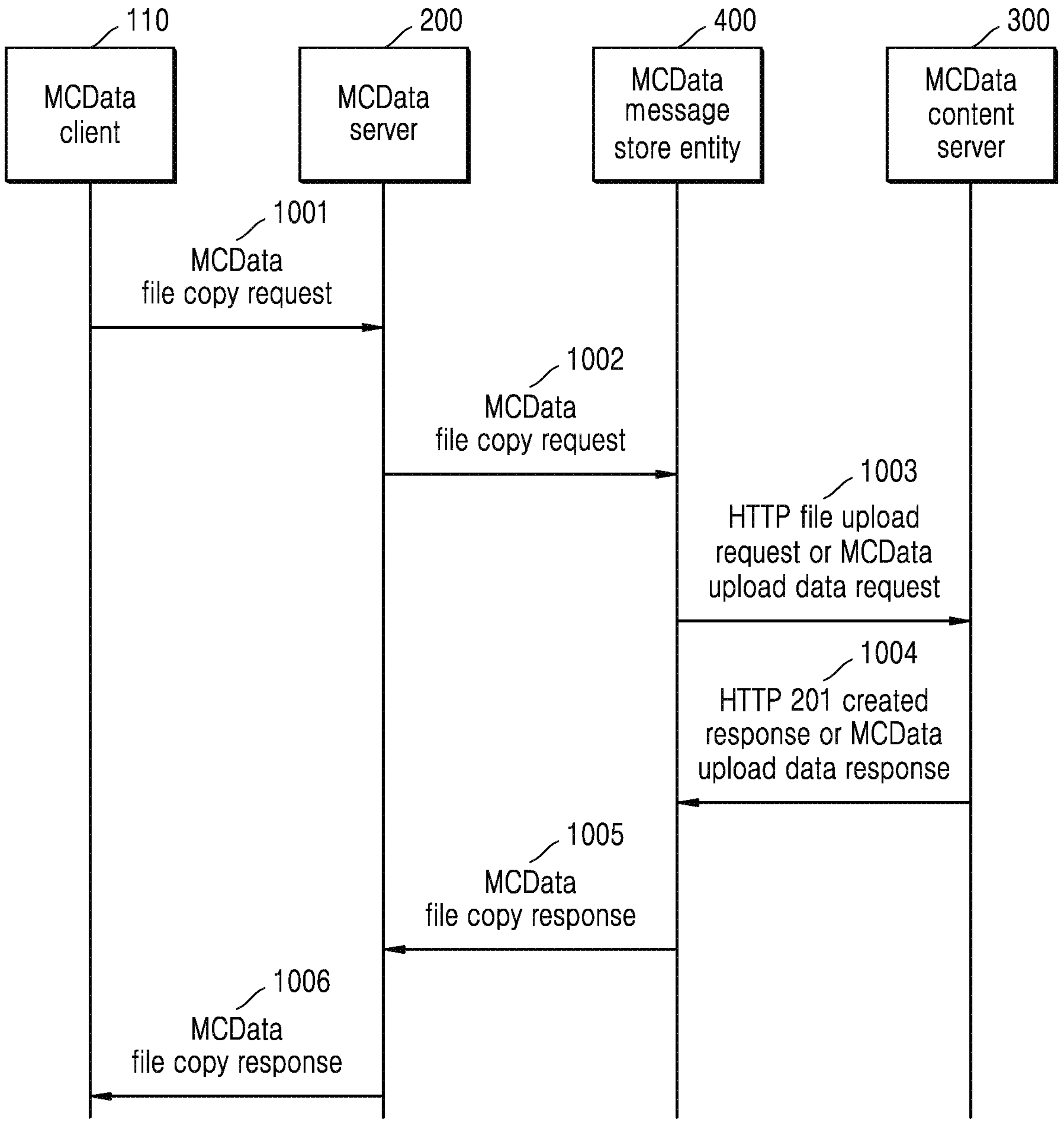
FIG. 10 is a sequence diagram illustrating another method of uploading the file content to the MCData content server by the MCData message store entity, according to an embodiment as disclosed herein.

FIG. 10 is a sequence diagram illustrating another method of uploading the file content to the MCData content server (300) by the MCData message store entity (400), according to an embodiment as disclosed herein. At 1001, when the MCData user wants to distribute the file content from the MCData user account in the MCData message store entity (400), the MCData client (110) sends the MCData file copy request to the MCData server (200). The MCData file copy request includes the object identifier corresponding to the file content and the destination URL where the file content has to be copied which is the URL of the MCData content server (300). The destination URL may not be required if the MCData server (200) knows a MCData content server location. At 1002, the MCData server (200) performs the necessary authorization check, and forwards the MCData file copy request to the MCData message store entity (400) if the authorization succeeds. At 1003, upon receiving the MCData file copy request, the MCData message store entity (400) extracts the file content from the object identified by the object identifier and uploads the file content from the MCData user's account to the MCData content server (300).

At 1004, the MCData content server (300) responds back with the URL of the file content stored in its repository (331). Further, the MCData message store entity (400) receives the MCData file upload response containing the URL of the file content uploaded at the MCData content server (300) from the MCData content server (300). At 1005, the MCData message store entity (400) sends the MCData file copy response containing the URL of the file content residing at the MCData content server (300) to the MCData server (200). At 1006, the MCData server (200) forwards the MCData file copy response by including the file URL to the MCData client (110). Then the MCData client (110) issues a new MCData FD request containing the file URL residing in the MCData content server (300) for file distribution.

Figure 11:
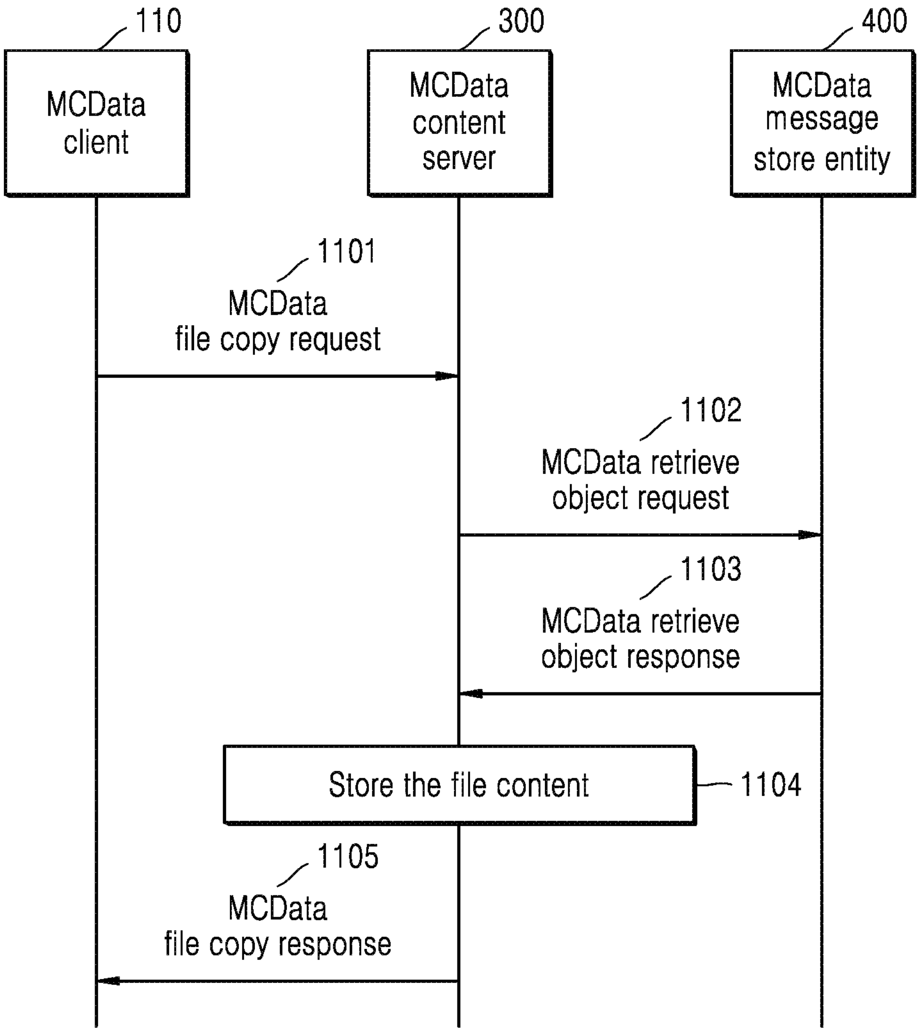
FIG. 11 is a sequence diagram illustrating a method of copying the file content from the MCData message store entity to the MCData content server, according to an embodiment as disclosed herein.

FIG. 11 is a sequence diagram illustrating a method of copying the file content from the MCData message store entity (400) to the MCData content server (300), according to an embodiment as disclosed herein. At 1101, when the MCData user wants to distribute the file content from the MCData user account in the MCData message store entity (400), the MCData client (110) sends the MCData file copy request containing the object identifier corresponding to the file content or the file URL to the MCData content server (300). The MCData content server (300) performs the necessary authorization check. At 1102-1103, if the authorization is succeeded, then the MCData content server (300) retrieves the object or the file content specified in the MCData file copy request from the MCData message store entity (400). At 1104, the MCData content server (300) stores the content of the file content in its repository (331). At 1105, the MCData content server (300) provides MCData file copy response containing the file URL of the file content residing in the repository (331) to the MCData client (110) which further used for the file distribution.

Figure 12:
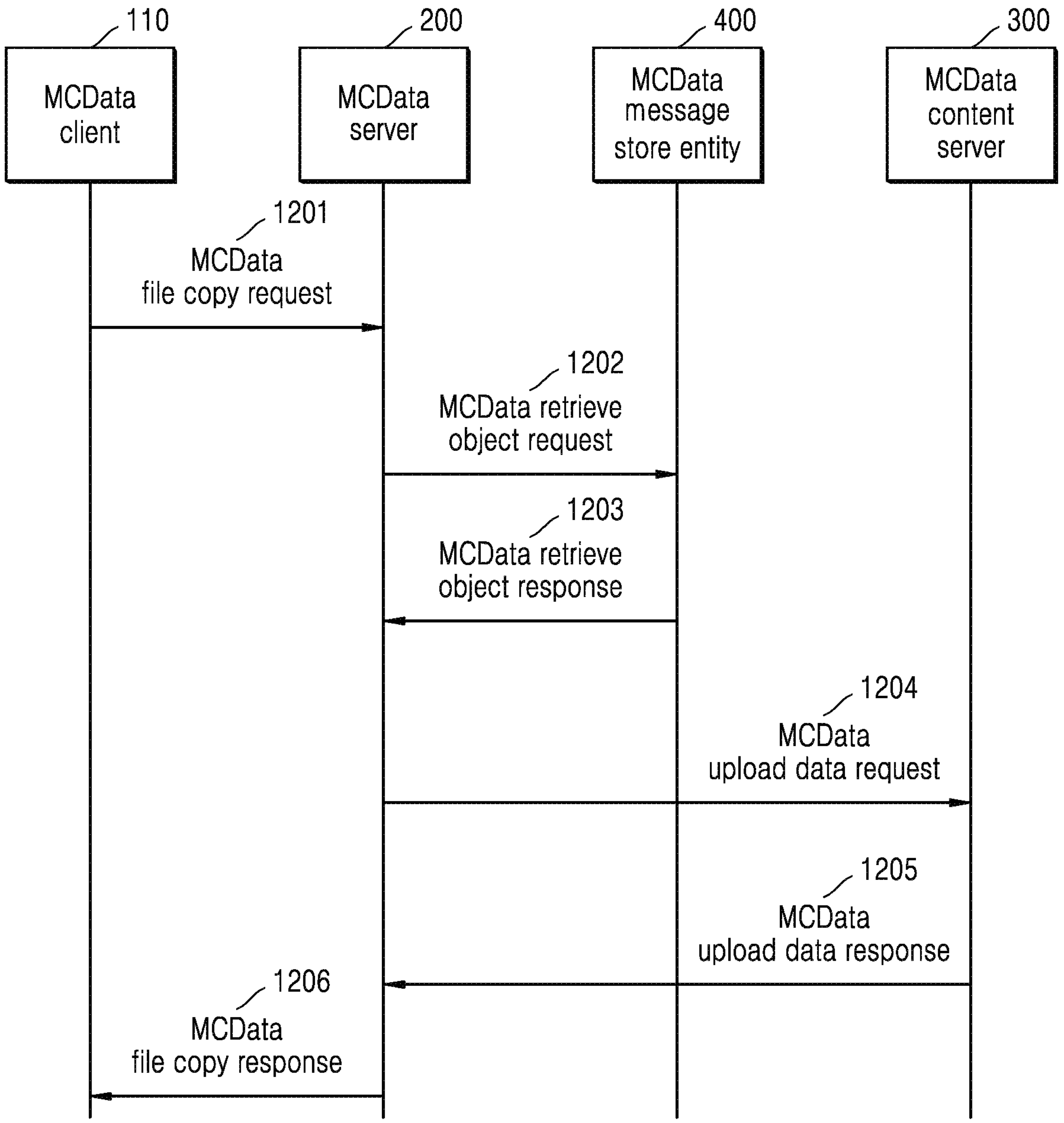
FIG. 12 is a sequence diagram illustrating a method of copying the file content from the MCData server to the MCData content server, according to an embodiment as disclosed herein.

FIG. 12 is a sequence diagram illustrating a method of copying the file content from the MCData server (200) to the MCData content server (300), according to an embodiment as disclosed herein. At 1201, when the MCData user wants to distribute the file content from the MCData user account in the MCData message store entity (400), the MCData client (110) sends the MCData file copy request containing the object identifier corresponding to the file content or the file URL residing in the MCData user account in the MCData message store entity (400) to the MCData server (200). The MCData server (200) performs the necessary authorization check. At 1202, if the authorization is succeeded, then the MCData server (200) retrieves the object or the file content specified in the MCData file copy request from the MCData message store entity (400) by sending a MCData retrieve object request. At 1203, the MCData message store entity (400) provides the MCData retrieve object response containing the file content to the MCData server (200)

At 1204, the MCData server (200) uploads the retrieved file content to the MCData content server (300) by issuing the MCData upload data request. At 1205, the MCData content server (300) provides the MCData upload data response containing the URL of the file content residing in its repository (331) to the MCData server (200). The MCData server (200) receives the URL of the stored file content from the MCData content server (300). At 1206, the MCData server (200) shares the file URL by sending the MCData file copy response to the MCData client (110), where the file URL further used by the MCData client (110) for the file distribution using existing procedures.

Figure 13:
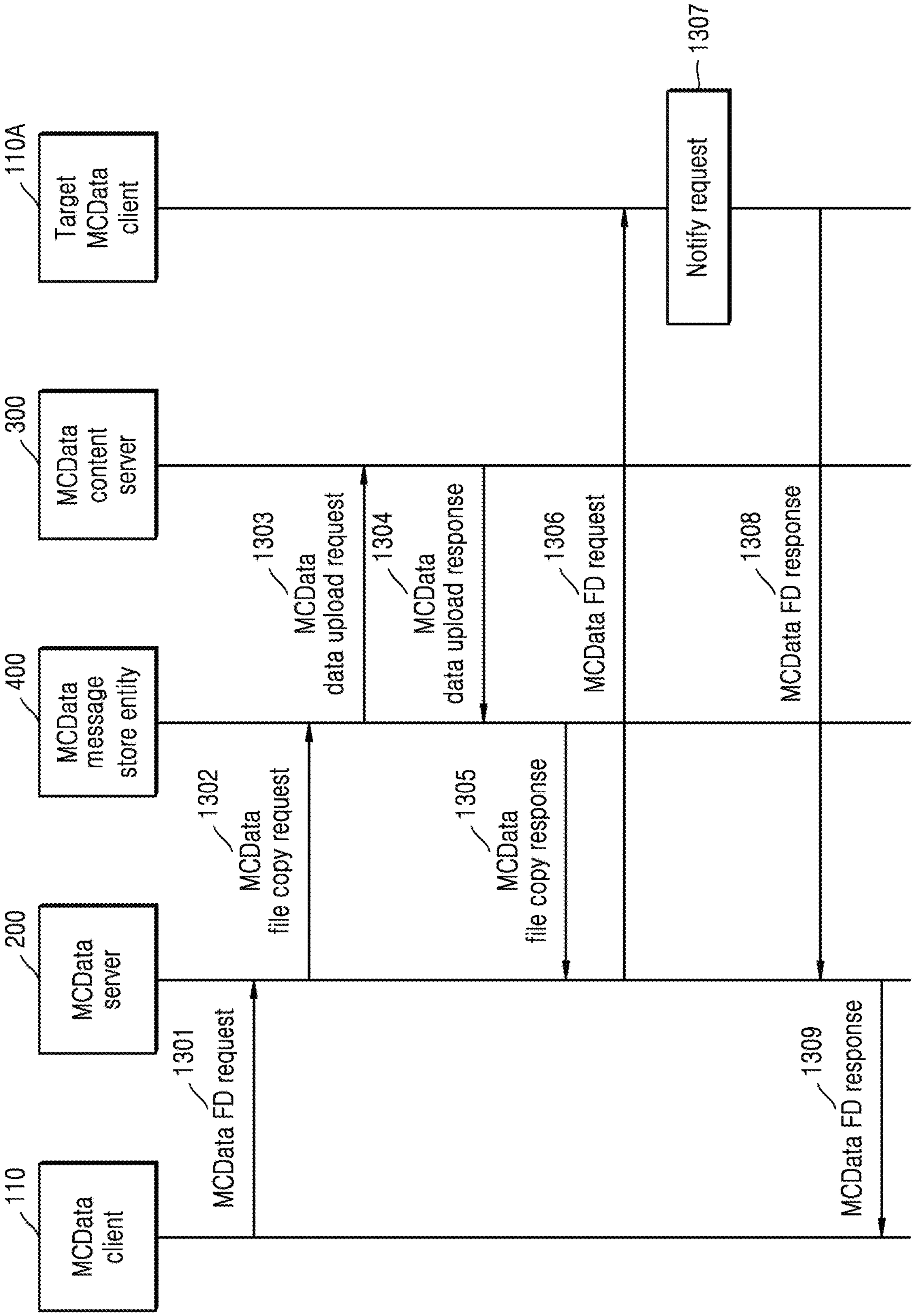
FIG. 13 is a sequence diagram illustrating a method of distributing the file content stored in the MCData message store entity to a recipient MCData user, according to an embodiment as disclosed herein.

FIG. 13 is a sequence diagram illustrating a method of distributing the file content stored in the MCData message store entity (400) to a recipient MCData user, according to an embodiment as disclosed herein. At 1301, he MCData client (110) sends the MCData FD request towards the MCData server (200). The MCData FD request contains content payload (i.e., content reference) in the form of file URL and may contain the file metadata information. This file URL points to the object or the file content residing in the MCData user account in the MCData message store entity (400). In an embodiment, the MCData FD request carries an indicator indicates that file URL is the file content present in the MCData message store entity (400), In another embodiment, the MCData server (200) identifies that file URL is the file content present in the MCData message store entity (400) by checking a host part of the URL.

At 1302, the MCData server (200) checks whether the MCData user at MCData client (110) is authorized to send the MCData FD request. If the MCData user at MCData client (110) is authorized, then the MCData server (200) sends the MCData file copy request to the MCData message store entity (400). At 1303, upon receiving the MCData file copy request, the MCData message store entity (400) uploads the file content residing in the MCData user's account to the MCData content server (300) by sending the MCData data upload request. At 1304, the MCData content server (300) stores the received file content and provides a MCData data upload response indicating the success along with the file URL of the file content in the MCData content server (300) or the failure. At 1305, the MCData message store entity (400) provides the MCData file copy response to the MCData server (200) containing the file URL received from the MCData content server (300). At 1306, the MCData server (200) initiates the MCData FD request towards the target MCData client (110A) of the recipient MCData user by replacing the content reference with the file URL received from the MCData content server (300).

At 1307, the target MCData client (110A) notifies the recipient MCData user about the incoming MCData FD request (including file metadata, if present) which may be further accepted or rejected or ignored by the recipient MCData user. The recipient MCData user may provide a response (i.e., accept or reject) or not (ignore) to the notification, then the target MCData client (110A) sends the MCData FD response to the MCData server (200) at 1308. In an embodiment, the target MCData client (110A) automatically sends accepted MCData FD response when the incoming request includes a mandatory download indication. At 1309, the MCData server (200) forwards the MCData FD response to the MCData client (110). Since, the content reference received from the MCData client (110) is replaced with the file URL received from the MCData content server (300), the MCData server (200) chooses to send the file URL received from the MCData content server (300) to the MCData client (110) in the MCData FD response.

Figure 14:
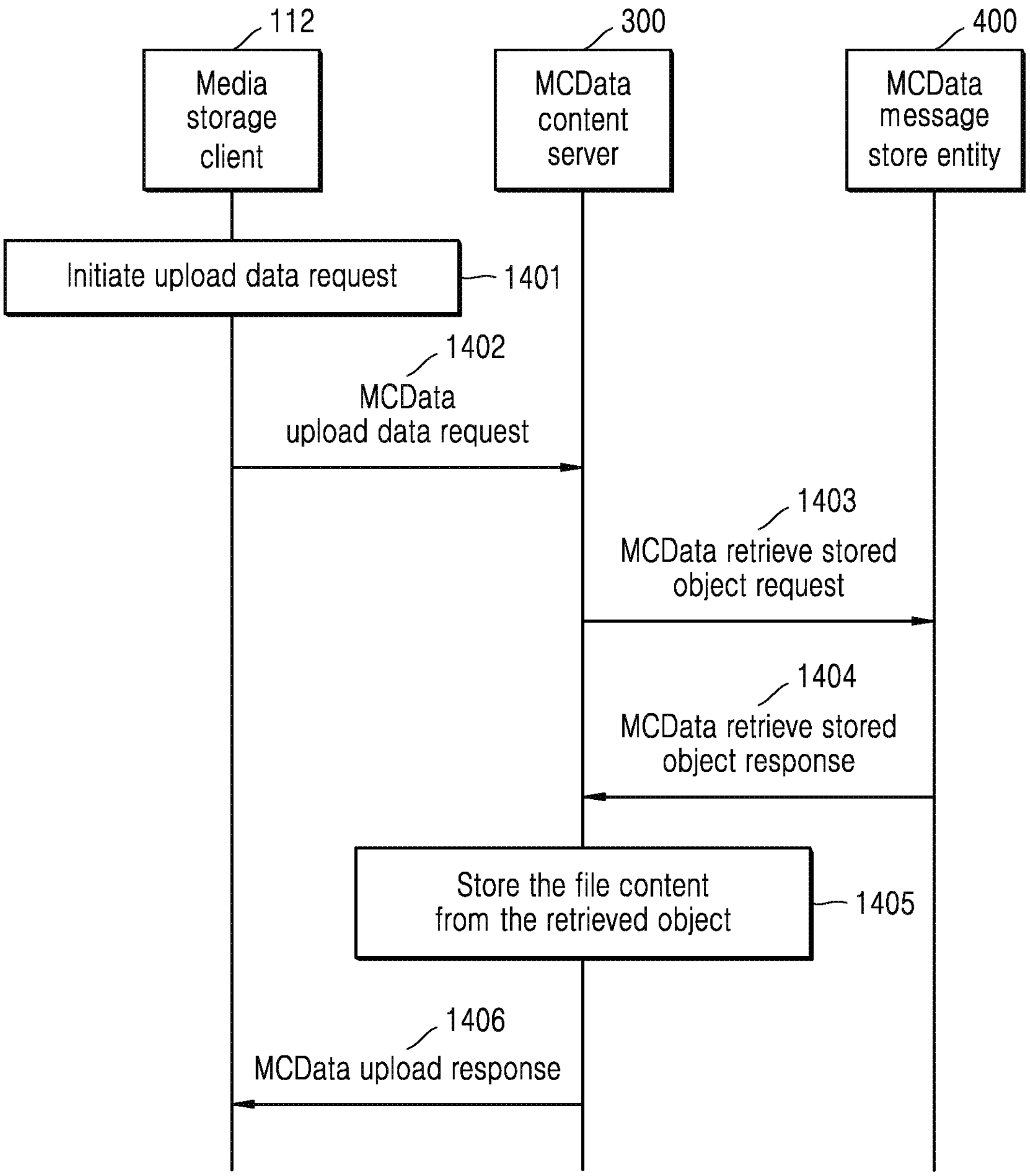
FIG. 14 is a sequence diagram illustrating a method for retrieving the file content from the MCData message store entity and storing in a repository of the MCData content server, according to an embodiment as disclosed herein.

FIG. 14 is a sequence diagram illustrating a method for retrieving the file content from the MCData message store entity (400) and storing into the repository of the MCData content server (300), according to an embodiment as disclosed herein. Preconditions in this embodiment are: the MCData user on the media storage client (112) is registered for receiving the MCData service, and the MCData content server (300) has the ability to verify if the requesting MCData user is authorized to upload. At 1401, the MCData user at the media storage client (112) initiates the upload data request of the file content residing in the MCData message store entity account. At 1402, the media storage client (112) sends the MCData upload data request to the MCData content server (300). The MCData upload data request includes the content reference of the file residing in the MCData message store entity account of the MCData user instead of sending the file content in the MCData upload request. In an embodiment, the MCData upload data request includes the object identifier of the stored object which contains the file to be distributed. If MCData emergency state is already set for the media storage client (112) due to previously triggered MCData emergency alert, then the media storage client (112) sets an emergency indicator in the file upload request.

The media storage client (112) verifies that a size of the file content is within a maximum data size for the FD for the intended MCData FD request by checking a group configuration for a group FD request and by checking the service configuration for a one-to-one FD request. At 1403, the MCData content server (300) initiates a MCData retrieve by sending a MCData retrieve stored object request towards the MCData message store entity (400). A unique object identifier of the stored object is included in the MCData retrieve stored object request. In an embodiment, the MCData content server (300) uses the existing MCData retrieve stored object request or any other request based on HTTP to retrieve the file content or the object from the MCData message store entity (400). At 1404, the MCData message store entity (400) returns the stored object that is identified by the object identifier in the MCData retrieve through a MCData retrieve stored object response to the MCData content server (300). In another embodiment, the MCData message store entity (400) returns the object or just the file content in the MCData retrieve object response. At 1405, the MCData content server (300) extracts and stores the file content from the retrieved object into its repository (331). At 1406, the MCData content server (300) provides the MCData upload response indicating the success along with file URL or the failure to the media storage client (112).

Figure 15:
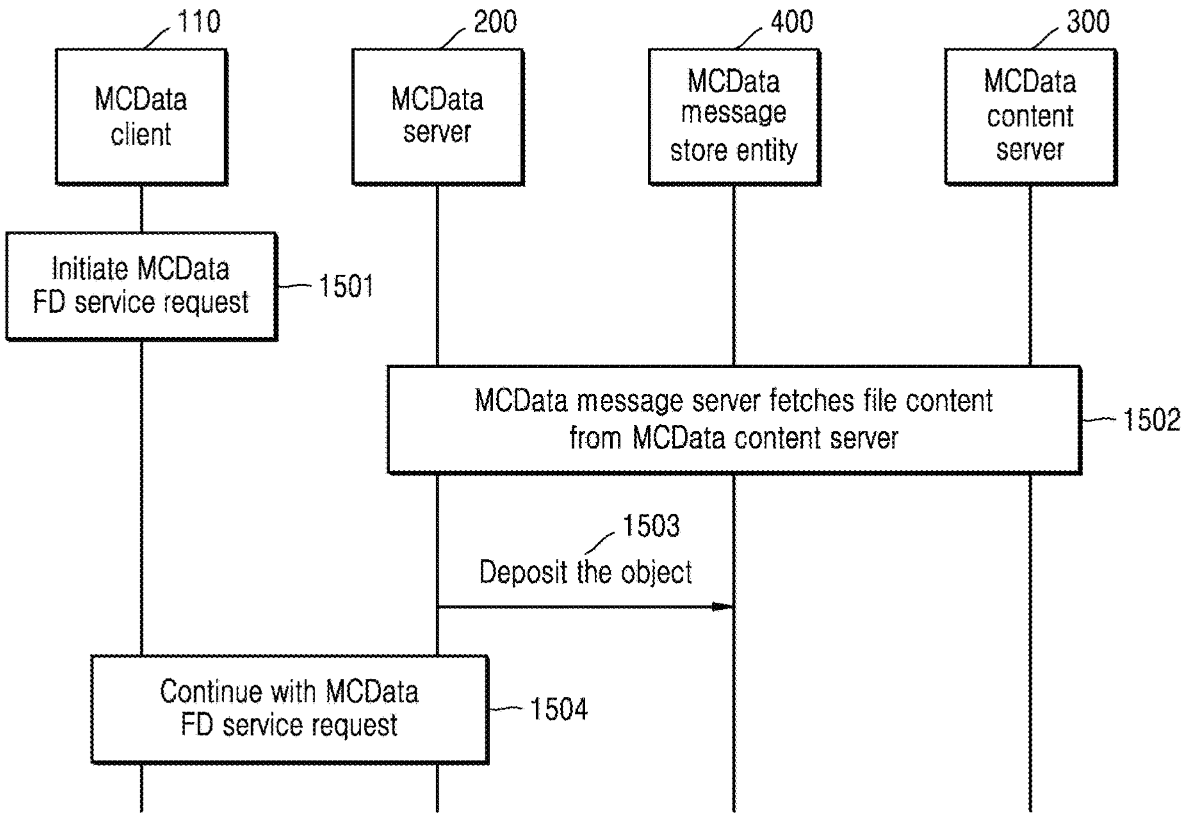
FIG. 15 is a sequence diagram illustrating a method for depositing the file content from the MCData content server to the MCData message store entity, according to an embodiment as disclosed herein.

FIG. 15 is a sequence diagram illustrating a method for depositing the file content from the MCData content server (300) to the MCData message store entity (400), according to an embodiment as disclosed herein. Preconditions in this embodiment are: the MCData user has the account created at the MCData message store entity (400), and the MCData user has requested to store the MCData communication of the MCData user. At 1501, the MCData client (110) initiates the MCData FD service request, where the MCData FD service request is a private communication or a group communication. At 1502, if the MCData FD service request is based on HTTP, then the MCData server (200) fetches the file content from the MCData content server (300). At 1503, the MCData server (200) stores the FD communication as the object to the MCData user account in the MCData message store entity (400). At 1504, the MCData server (200) checks and authorizes the MCData FD service request and continue the MCData FD service request towards the targeted MCData clients (110A).

Figure 16:
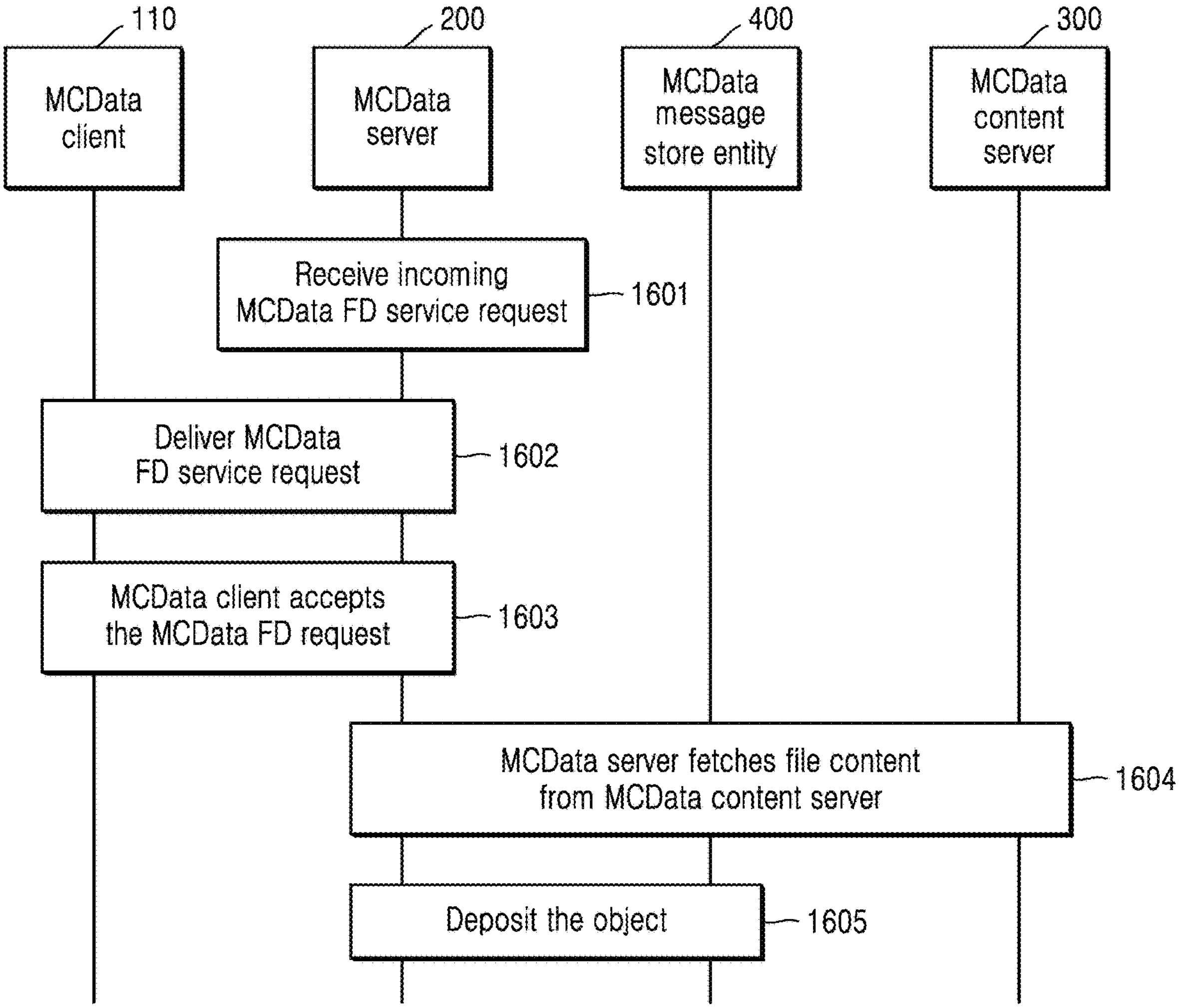
FIG. 16 is a sequence diagram illustrating a method for depositing an incoming FD communication to the MCData message store entity by the MCData server, according to an embodiment as disclosed herein.

FIG. 16 is a sequence diagram illustrating a method for depositing the incoming FD communication to the MCData message store entity (400) by the MCData server (200), according to an embodiment as disclosed herein. Preconditions in this embodiment are: the MCData user has the account created with the MCData message store entity (400), and the MCData user has requested to store the MCData communication. At 1601, the MCData server (200) receives the incoming MCData FD service request for the MCData user. In an embodiment, the incoming MCData FD service request is a response to an earlier service request sent by the MCData user or a new service request coming from any sender. At 1602, the MCData server (200) delivers the MCData FD service request to the MCData client (110) of the MCData user. At 1603 the MCData client (110) accepts the MCData FD service request. At 1604, the MCData server (200) fetches the file content from the MCData content server (300). At 1605, the MCData server (200) stores the communication as the object to the MCData user account in the MCData message store entity (400).

Figure 17:
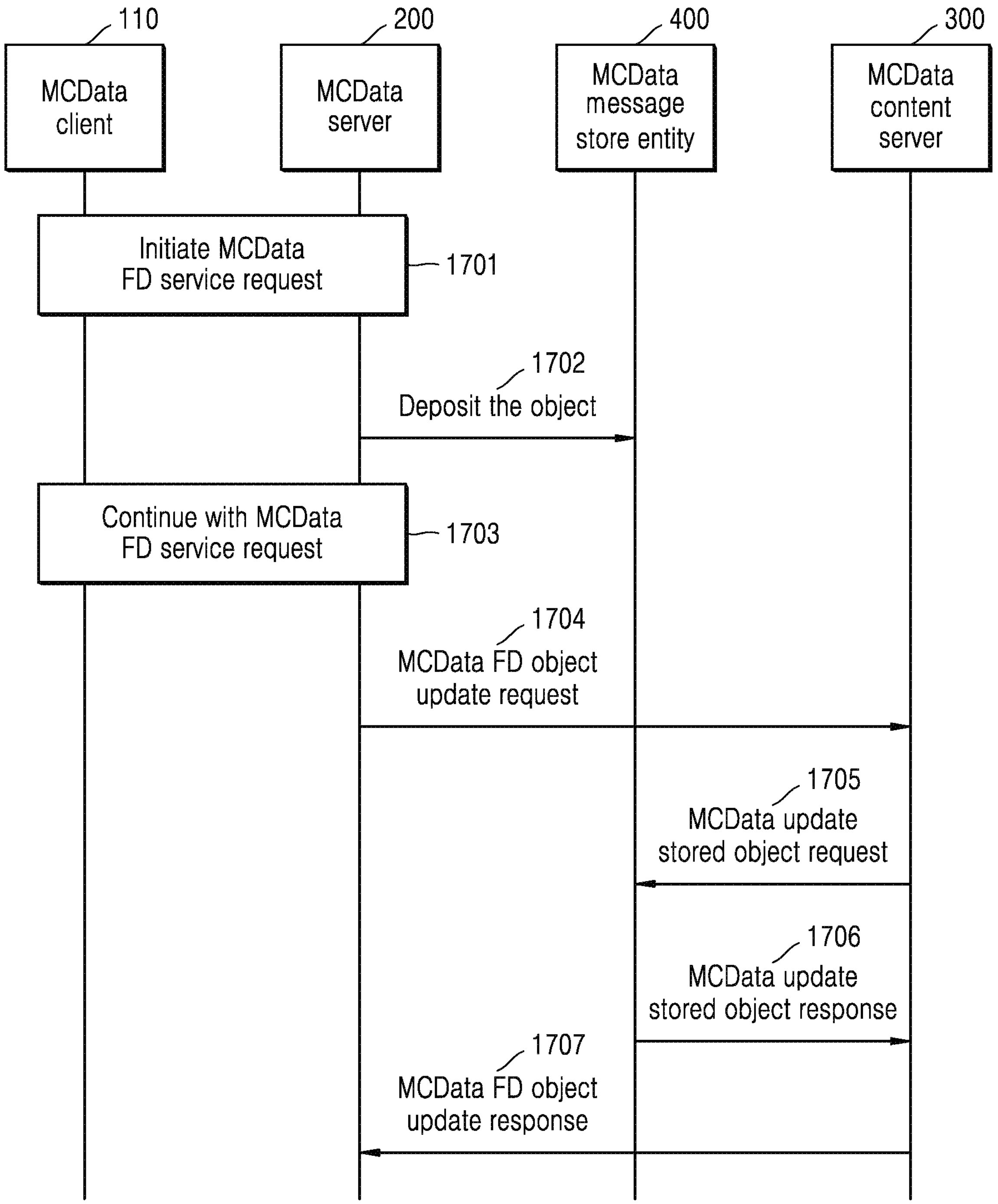
FIG. 17 is a sequence diagram illustrating a method for updating an object stored as the outgoing FD communication at the MCData message store entity with the file content, according to an embodiment as disclosed herein.

FIG. 17 is a sequence diagram illustrating a method for updating the object stored as the outgoing FD communication at the MCData message store entity (400) with the file content, according to an embodiment as disclosed herein. This embodiment is applicable for the FD communication using HTTP. Since the file content is stored in the MCData content server (300), the MCData server (200) deposits the FD communication object and requests the MCData content server (300) to update the object with the file content. The MCData server (200) shares the object identifier of the FD communication object and the file URL to the MCData content server (300) through the MCData-FD-5 interface using a HTTP REST APIs or a SIP. Preconditions in this embodiment are: the MCData user has the account created with MCData message store entity (400), and the MCData user has requested to store the MCData communication. At 1701, the MCData client (110) initiates the MCData FD service request, where the MCData FD service request is the private communication or the group communication.

At 1702, the MCData server (200) stores the FD communication as the object to the MCData user account in the MCData message store entity (400). The deposited object contains all the details of the FD communication except the file content. At 1703, the MCData server (200) checks and authorizes the MCData FD service request and continues the MCData FD service request toward the targeted MCData client (110A). At 1704, the MCData server (200) sends the MCData FD object update request to the MCData content server (300). The MCData FD object update request includes the identifier of the deposited object, the URL of the file content received in the FD service request and the MCData ID of the MCData user. At 1705, the MCData content server (300) updates the object with the file content by sending the MCData update stored object request to the MCData message store entity (400), where the MCData update stored object request includes the file content. At 1706, the MCData message store entity (400) responds with the MCData update stored object response to the MCData content server (300). At 1707, the MCData content server (300) responds with MCData FD object update response to the MCData server (200). Table 6 describes information elements in the MCData FD object update request. Table 7 describes information elements in the MCData FD object update response.

TABLE 6

| Information element | Status | Description |
|---|---|---|
| MCData ID | M | The identity of the MCData user whose MCData message store entity account to be updated |
| Object identifier | M | The object identifier of the object stored in the MCData message store entity |
| Metadata | M | The meta data carries the URL reference of the file residing in the MCData content server. |

TABLE 7

| Information element | Status | Description |
|---|---|---|
| Result | M | The result if the update is success or failure |

Figure 18:
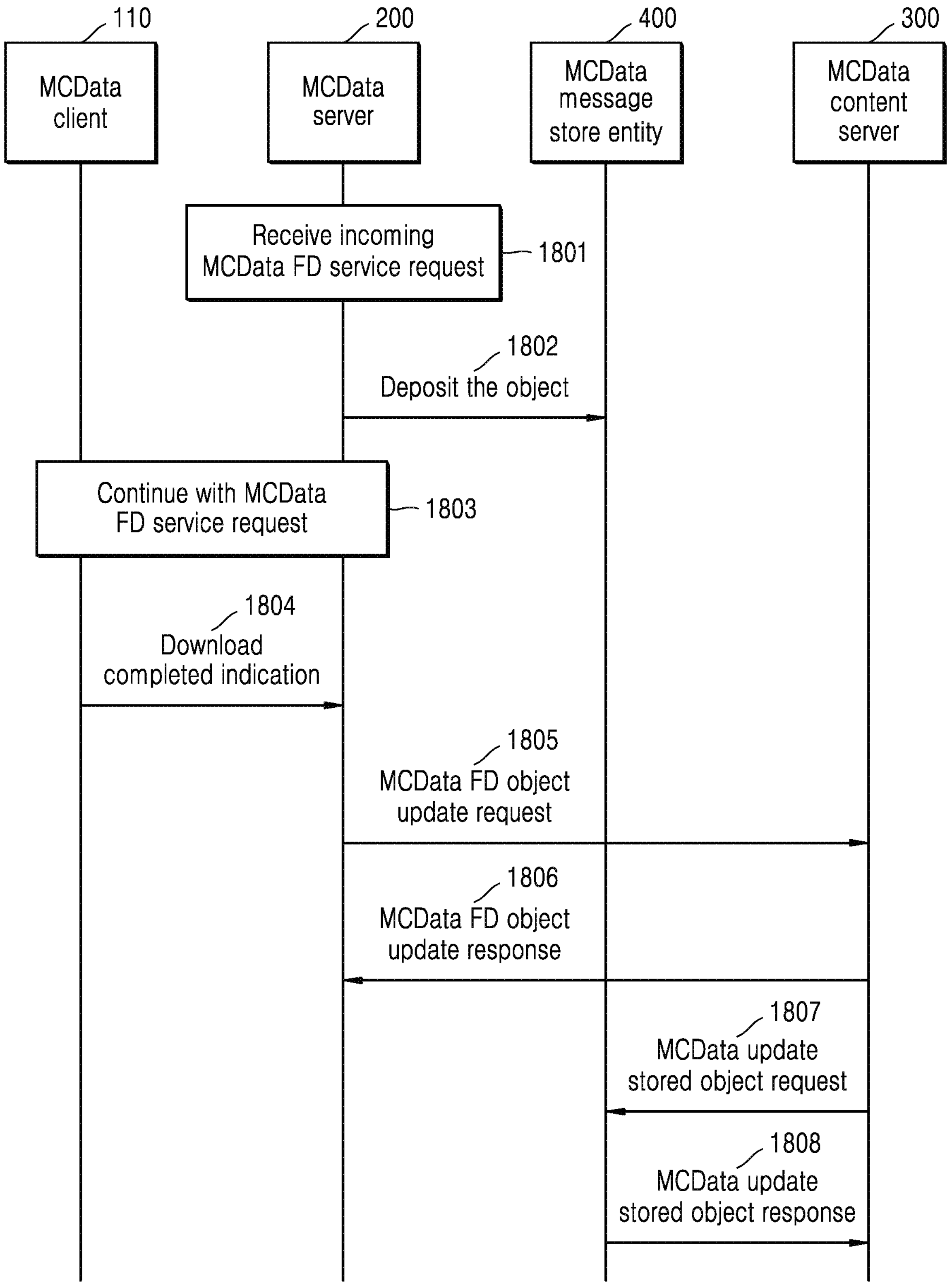
FIG. 18 is a sequence diagram illustrating a method for updating an object stored as the incoming FD communication at the MCData message store entity with the file content, according to an embodiment as disclosed herein.

FIG. 18 is a sequence diagram illustrating a method for updating the object stored as the incoming FD communication at the MCData message store entity (400) with the file content, according to an embodiment as disclosed herein. Preconditions in this embodiment are: the MCData user has the account created with MCData message store entity (400), and the MCData user has requested to store the MCData communication. At 1801, the MCData server (200) receives the incoming MCData FD service request for the MCData user. In an embodiment, the incoming MCData FD service request is a response to an earlier service request sent by the MCData user or a new service request coming from any sender. The MCData server (200) checks and authorizes the service request and continue the service request toward the MCData client (110). At 1802, the MCData server (200) stores the FD communication as the object to the MCData user account in the MCData message store entity (400). The deposited object contains all the details of the FD communication except the file content. At 1803, the MCData server (200) checks and authorizes the MCData FD service request and continues the MCData FD service request toward the targeted MCData client (110A).

At 1804, the MCData client (110) informs the MCData server (200) that download of the file content is completed either using the MCData download completed report or through any other mechanism. At 1805, the MCData server (200) sends the MCData FD object update request to the MCData content server (300). The MCData FD object update request includes the identifier of the deposited object, the URL of the file received in the FD service request and the MCData ID of the MCData user. At 1806, the MCData content server (300) updates the object with the file content by sending the MCData update stored object request to the MCData server (200), where the MCData update stored object request includes the file content. At 1807, the MCData content server (300) sends the MCData update stored object request to the MCData message store entity (400), where the MCData update stored object request includes the file content. At 1808, the MCData message store entity (400) responds with the MCData update stored object response to the MCData content server (300).

Figure 19:
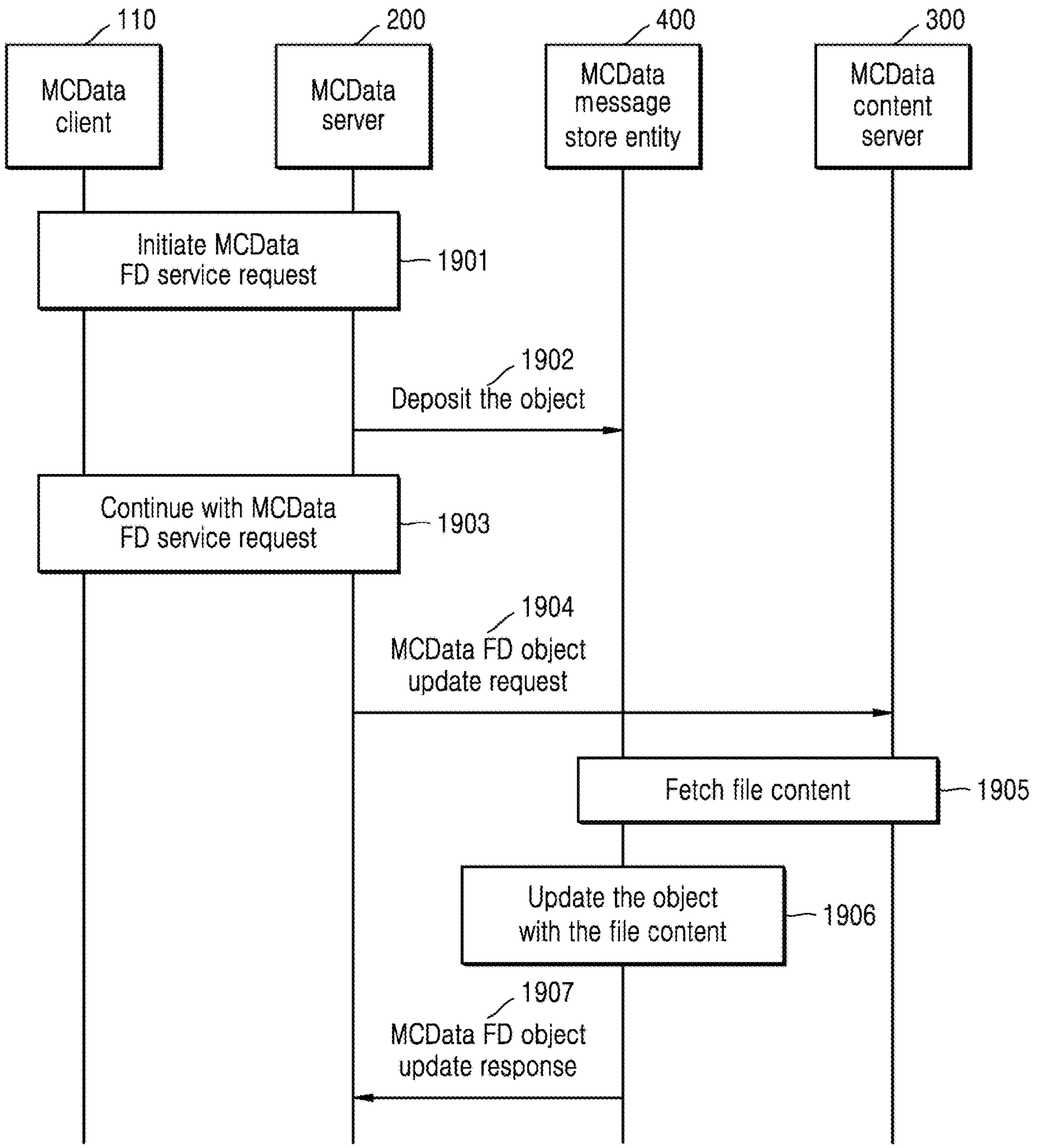
FIG. 19 is a sequence diagram illustrating another method for updating the object stored as the outgoing FD communication at the MCData message store entity with the file content, according to an embodiment as disclosed herein.

FIG. 19 is a sequence diagram illustrating another method for updating the object stored as the outgoing FD communication at the MCData message store entity (400) with the file content, according to an embodiment as disclosed herein. This embodiment is applicable for the FD communication using HTTP. Since the file content is stored in the MCData content server (300) the MCData server (200) deposits the FD communication object and requests the MCData message store entity (400) to retrieve the file content from the MCData content server (300) to update the FD communication object with the file content. The MCData-8 is used by the MCData server (200) for requesting the MCData message store entity (400) to update the object. The MCData-FD-6 proposed in this disclosure is used by the MCData message store entity (400) to fetch the file content from the MCData content server (300) and update the FD communication object with the file content. Preconditions in this embodiment are: the MCData user has the account created with MCData message store entity (400), and the MCData user has requested to store the MCData communication. At 1901, the MCData client (110) initiates a MCData FD service request.

At 1902, the MCData server (200) stores the FD communication as the object to the MCData user account in the MCData message store entity (400). This object deposited includes all the details of the FD communication except the file content. At 1903, the MCData server (200) checks and authorizes the service request and continue the service request toward the targeted recipient(s) (i.e., MCData client (110)). At 1904, the MCData server (200) sends the MCData FD object update request to the MCData content server (300). The MCData FD object update request includes the identifier of the deposited object, the URL of the file received in the FD service request and the MCData ID of the MCData user. At 1905, the MCData message store entity (400) fetches the file from the MCData content server (300) using the URL received in the MCData FD object update request. At 1906, the MCData message store entity (400) updates the FD object with the file content. At 1907, the MCData message store entity (400) provides the MCData FD object update response to the MCData server (200).

Figure 20:
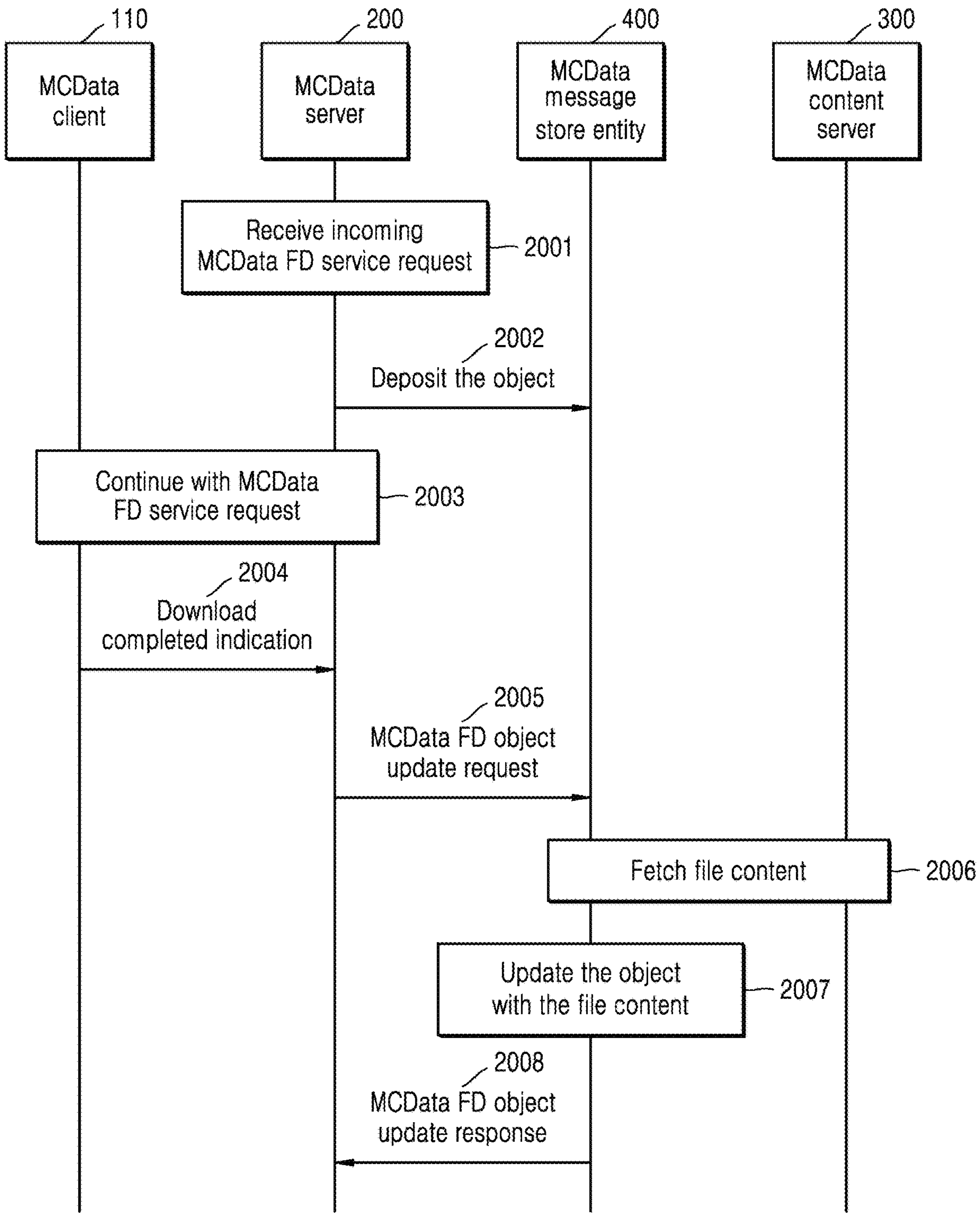
FIG. 20 is a sequence diagram illustrating another method for updating the object stored as the incoming FD communication at the MCData message store entity with the file content, according to an embodiment as disclosed herein.

FIG. 20 is a sequence diagram illustrating another method for updating the object stored as the incoming FD communication at the MCData message store entity (400) with the file content, according to an embodiment as disclosed herein. Preconditions in this embodiment are: the MCData user has the account created with MCData message store entity (400), and the MCData user has requested to store the MCData communication. At 2001, the MCData server (200) receives the incoming MCData FD service request for the MCData user. In an embodiment, the service request is the response to the earlier service request sent by the MCData user or the new service request coming from any sender. At 2002, the MCData server (200) stores the FD communication as the object to the MCData user account in the MCData message store entity (400). The deposited object includes all the details of the FD communication except the file content. At 2003, the MCData server (200) checks and authorizes the service request and continue the service request towards the targeted recipient(s) (i.e., MCData client (110)). At 2004, the) MCData client (110) informs the MCData server (200) that download of the file content is completed either using the MCData download completed report or through any other mechanism. At 2005, the MCData server (200) sends the MCData FD object update request to the MCData message store entity (400). The MCData FD object update request contains the identifier of the deposited object, URL of the file received in the FD service request and the MCData ID of the MCData user in whose account the FD communication is deposited as an object. At 2006, the MCData message store entity (400) fetches the file content from the MCData content server (300) using the URL received in the MCData FD object update request. At 2007, the MCData message store entity (400) updates the FD object with the file content. At 2008, the MCData message store entity (400) provides the MCData FD object update response to the MCData server (200).

Figure 21:
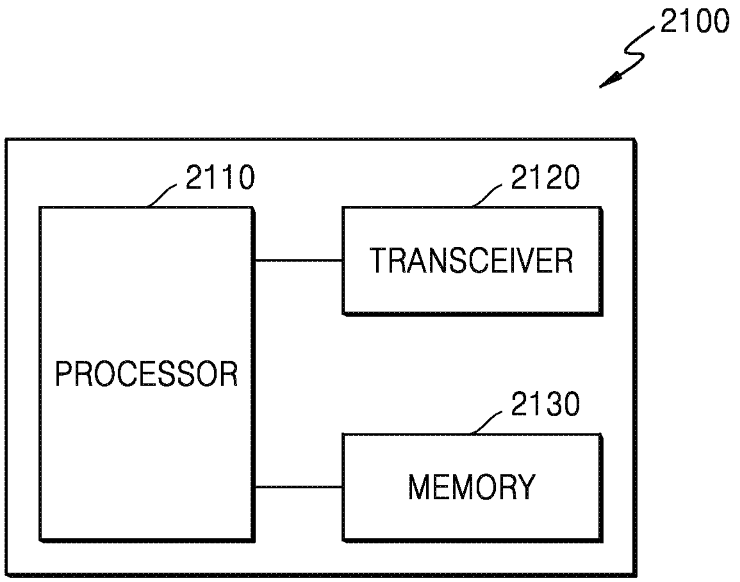
FIG. 21 illustrates a network entity according to embodiments of the present disclosure.

FIG. 21 illustrates a network entity according to embodiments of the present disclosure.

Referring to the FIG. 21, the network entity 2100 may include a processor 2110, a transceiver 2120 and a memory 2130. However, all of the illustrated components are not essential. The network entity 2100 may be implemented by more or less components than those illustrated in FIG. 21. In addition, the processor 2110 and the transceiver 2120 and the memory 2130 may be implemented as a single chip according to another embodiment.

The network entity 2100 may correspond to the MCData content server or the MCData message store entity described above. For example, the network entity 2100 may correspond to the MCData content server 300 or the MCData message store entity illustrated in FIG. 1B.

The aforementioned components will now be described in detail.

The processor 2110 may include one or more processors or other processing devices that control the proposed function, process, and/or method. Operation of the network entity 2100 may be implemented by the processor 2110.

The transceiver 2120 may include a RF transmitter for up-converting and amplifying a transmitted signal, and a RF receiver for down-converting a freqMCData UEncy of a received signal. However, according to another embodiment, the transceiver 2120 may be implemented by more or less components than those illustrated in components.

The transceiver 2120 may be connected to the processor 2110 and transmit and/or receive a signal. The signal may include control information and data. In addition, the transceiver 2120 may receive the signal through a wireless channel and output the signal to the processor 2110. The transceiver 2120 may transmit a signal output from the processor 2110 through the wireless channel.

The memory 2130 may store the control information or the data included in a signal obtained by the network entity 2100. The memory 2130 may be connected to the processor 2110 and store at least one instruction or a protocol or a parameter for the proposed function, process, and/or method. The memory 2130 may include read-only memory (ROM) and/or random access memory (RAM) and/or hard disk and/or CD-ROM and/or DVD and/or other storage devices.

Figure 22:
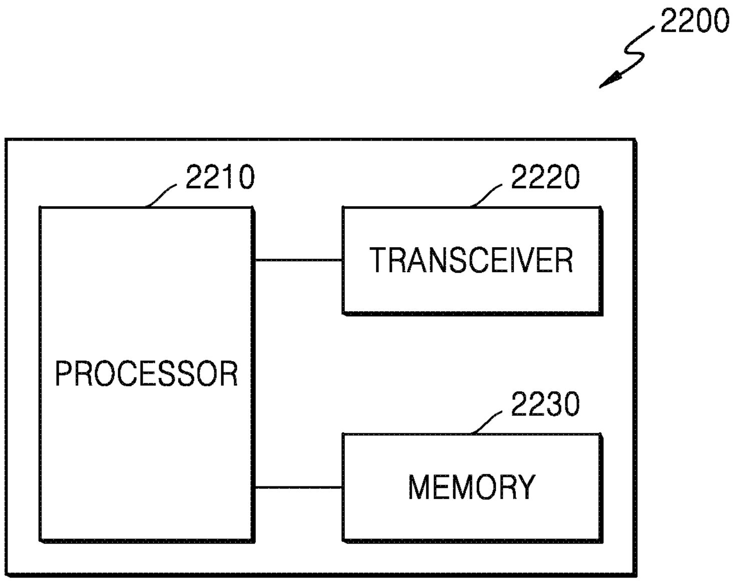
FIG. 22 illustrates a user equipment (UE) according to embodiments of the present disclosure.

FIG. 22 illustrates a user equipment (UE) according to embodiments of the present disclosure.

Referring to the FIG. 22, the UE 2200 may include a processor 2210, a transceiver 2220 and a memory 2230. However, all of the illustrated components are not essential. The UE 2200 may be implemented by more or less components than those illustrated in FIG. 22. In addition, the processor 2210 and the transceiver 2220 and the memory 2230 may be implemented as a single chip according to another embodiment.

The UE 2200 may correspond to the UE described above. For example, UE 2200 may correspond to the MCData UE 100 illustrated in FIG. 1A.

The aforementioned components will now be described in detail.

The processor 2210 may include one or more processors or other processing devices that control the proposed function, process, and/or method. Operation of the UE 2200 may be implemented by the processor 2210.

The transceiver 2220 may include a RF transmitter for up-converting and amplifying a transmitted signal, and a RF receiver for down-converting a frequency of a received signal. However, according to another embodiment, the transceiver 2220 may be implemented by more or less components than those illustrated in components.

The transceiver 2220 may be connected to the processor 2210 and transmit and/or receive a signal. The signal may include control information and data. In addition, the transceiver 2220 may receive the signal through a wireless channel and output the signal to the processor 2210. The transceiver 2220 may transmit a signal output from the processor 2210 through the wireless channel.

The memory 2230 may store the control information or the data included in a signal obtained by the UE 2200. The memory 2230 may be connected to the processor 2210 and store at least one instruction or a protocol or a parameter for the proposed function, process, and/or method. The memory 2230 may include read-only memory (ROM) and/or random access memory (RAM) and/or hard disk and/or CD-ROM and/or DVD and/or other storage devices.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising: transmitting, to a mission critical data (MCData) content server, an MCData upload request message indicating a uniform resource locator (URL) of a file residing in an MCData message store entity, wherein the file resides in a secured storage area of the MCData message store entity, the secured storage area being dedicated to an MCData user, wherein the file is fetched from the MCData message store entity via a reference point MCData-file distribution (FD)-7, based on the URL, wherein the reference point MCData-FD-7 exists between a media storage function in the MCData content server and the MCData message store entity, and wherein the file is stored into a repository of the MCData content server.

2. The method of claim 1, further comprising:

receiving, from the MCData content server, an MCData upload response message indicating a success or a failure.

3. The method of claim 2, wherein in case that the MCData upload response message indicates the success, the MCData upload response message further indicates a URL associated with the stored file.

4. The method of claim 1, wherein the MCData upload request message includes information associated with an identity of the MCData user uploading the file.

5. The method of claim 1, wherein the file stored in the repository is shared by other MCData users.

6. The method of claim 1, wherein the UE includes a media storage client.

7. The method of claim 1, wherein the MCData user is authorized to access the secured storage area.

8. A method performed by a mission critical data (MCData) content server in a wireless communication system, the method comprising: receiving, from a user equipment (UE), an MCData upload request message indicating a uniform resource locator (URL) of a file residing in an MCData message store entity, wherein the file resides in a secured storage area of the MCData message store entity, the secured storage area being dedicated to an MCData user; fetching, via a reference point MCData-file distribution (FD)-7, the file from the MCData message store entity, based on the URL, wherein the reference point MCData-FD-7 exists between a media storage function in the MCData content server and the MCData message store entity; and storing the file into a repository of the MCData content server.

9. The method of claim 8, further comprising:

transmitting, to the UE, an MCData upload response message indicating a success or a failure.

10. The method of claim 9, wherein in case that the MCData upload response message indicates the success, the MCData upload response message further indicates a URL associated with the stored file.

11. The method of claim 8, wherein the MCData upload request message includes information associated with an identity of the MCData user uploading the file.

12. The method of claim 11, wherein the file stored in the repository is shared by other MCData users.

13. The method of claim 8, wherein the UE includes a media storage client.

14. The method of claim 8, wherein the MCData user is authorized to access the secured storage area.

15. A user equipment (UE) in a wireless communication system, the UE comprising: a transceiver; and at least one processor coupled with the transceiver and configured to: transmit, to a mission critical data (MCData) content server via the transceiver, an MCData upload request message indicating a uniform resource locator (URL) of a file residing in an MCData message store entity, wherein the file resides in a secured storage area of the MCData message store entity, the secured storage area being dedicated to an MCData user, wherein the file is fetched from the MCData message store entity via a reference point MCData-file distribution (FD)-7, based on the URL, wherein the reference point MCData-FD-7 exists between a media storage function in the MCData content server and the MCData message store entity, and wherein the file is stored into a repository of the MCData content server.

16. A mission critical data (MCData) content server in a wireless communication system, the MCData content server comprising: a transceiver; and at least one processor coupled with the transceiver and configured to: receive, from a user equipment (UE) via the transceiver, an MCData upload request message indicating a uniform resource locator (URL) of a file residing in an MCData message store entity, wherein the file resides in a secured storage area of the MCData message store entity, the secured storage area being dedicated to an MCData user, fetch, via the transceiver, the file from the MCData message store entity, based on the URL, via a reference point MCData-file distribution (FD)-7, wherein the reference point MCData-FD-7 exists between a media storage function in the MCData content server and the MCData message store entity, and store the file into a repository of the MCData content server.

* * * * *